United States Patent
Sampat et al.

(10) Patent No.: US 6,279,029 B1
(45) Date of Patent: Aug. 21, 2001

(54) SERVER/CLIENT ARCHITECTURE AND METHOD FOR MULTICASTING ON A COMPUTER NETWORK

(75) Inventors: Ketan Sampat, Portland; Troy Acott, Beaverton; Gunner Danneels, Beaverton; Ramamurthy Sivakumar, Beaverton; Galen Spooner, Beaverton, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/134,025

(22) Filed: Oct. 12, 1993

(51) Int. Cl.⁷ .................................................. G06F 15/16

(52) U.S. Cl. ........................................ 709/203; 709/231

(58) Field of Search .................................. 395/800, 200, 395/820, 154, 600, 650, 700, 200.02; 370/13; 709/203, 231

(56) References Cited

U.S. PATENT DOCUMENTS

| | | | |
|---|---|---|---|
| 4,204,206 | 5/1980 | Bakula et al. | 345/115 |
| 4,819,160 | 4/1989 | Tanka et al. | 395/600 |
| 4,914,571 | 4/1990 | Baratz et al. | 395/600 |
| 4,942,574 * | 7/1990 | Zelle | 370/85.15 |
| 4,974,149 | 11/1990 | Valenti | 395/650 |
| 5,005,167 * | 4/1991 | Arthurs et al. | 370/4 |

(List continued on next page.)

FOREIGN PATENT DOCUMENTS 0529864   3/1993   (EP) .

OTHER PUBLICATIONS

Douglas A. Young, "X Window Systems", 1989, pp. 264–283.*
Banet, Bernard A., "Progress in CD–ROM Publishing: A Look at New Tools and Titles." Seybold Report on Desktop Publishing, vol. 8, No. 8, p. 15, Apr. 4, 1994.
Ripley, G. David, "DVI—A Digital Multimedia Technology." Communications of the ACM, vol. 32, No. 7, p. 811, Jul. 1989.
Cross, Jerry, "Playing Live Digital Video Under Windows." Windows—DOS Developer's Journal, vol. 3, No. 3, p. 39, Mar. 1992.
Vakalopoulou, Maria, "Multimedia–Endgeräte." Nachrichtentechnik Elektronik, vol. 42, No. 2, Mar. 1992, Berlin, pp. 56–58.

(List continued on next page.)

Primary Examiner—John A. Follansbee
(74) Attorney, Agent, or Firm—Duane, Morris & Heckscher LLP

(57) ABSTRACT

A server/client for a network-based multicast system has a media services manager and one or more media service providers. When functioning as a server, the media service providers receive data corresponding to a channel having one or more related data streams, where each media service provider receives data corresponding to a data stream of the channel. In the server, the media services manager receives the data from the media service providers and transmits the data to the network. When functioning as a client, the media services manager receives data from the network for a selected channel having one or more related data streams. In the client, the media service providers receive and play the data from the media services manager, where each media service provider receives and plays data corresponding to a data stream of the channel. In a preferred embodiment, a channel has logically related audio, video, and/or text data streams.

22 Claims, 21 Drawing Sheets

U.S. PATENT DOCUMENTS

| | | | |
|---|---|---|---|
| 5,089,956 | | 2/1992 | MacPhail ............................... 395/600 |
| 5,179,556 | * | 1/1993 | Turner ................................. 370/94.1 |
| 5,202,961 | | 4/1993 | Mills et al. ........................... 395/159 |
| 5,206,929 | | 4/1993 | Langford et al. ..................... 395/159 |
| 5,216,427 | * | 6/1993 | Yan et al. ............................. 342/352 |
| 5,247,678 | | 9/1993 | Littleton ............................... 395/700 |
| 5,257,369 | * | 10/1993 | Skeen et al. .......................... 395/650 |
| 5,287,530 | * | 2/1994 | Davis et al. .......................... 370/94.1 |
| 5,291,477 | * | 3/1994 | Liew ..................................... 370/54 |
| 5,291,601 | | 3/1994 | Sands .................................... 395/700 |
| 5,305,311 | * | 4/1994 | Lyles ..................................... 370/60 |
| 5,313,454 | * | 5/1994 | Bustini et al. ......................... 370/13 |
| 5,321,693 | * | 6/1994 | Perlman .............................. 370/85.13 |
| 5,331,637 | * | 7/1994 | Francis et al. ......................... 370/54 |
| 5,339,392 | * | 8/1994 | Risberg et al. ....................... 395/161 |
| 5,341,474 | * | 8/1994 | Gelman et al. ....................... 395/200 |
| 5,374,952 | | 12/1994 | Flohr ...................................... 348/12 |
| 5,375,068 | * | 12/1994 | Palmer et al. ......................... 364/514 |
| 5,388,197 | | 2/1995 | Rayner .................................. 395/154 |
| 5,392,223 | | 2/1995 | Caci .................................. 364/514 A |

OTHER PUBLICATIONS

Fox, Edward A., "Advances in Interactive Digital Multimedia Systems." Computer, vol. 24, No. 10, Oct. 1991, Long Beach, US, pp. 9–21.

Little, T.D.C., et al., "Network Considerations for Distributed Multimedia Object Composition and Communication." IEEE Network: The Magazine of Computer Communications, vol. 4, No. 6, Nov. 1990, New York, US, pp. 32–49, XP172741. See p. 39, right col., line 1—p. 48, left col., line 29.

Vin, H.M., et al., "Multimedia Conferencing in the Etherphone Environment," Computer, vol. 24, No. 10, Oct. 1991, Los Alamitos, CA, US.

Rangan, V.P., et al., "Designing an On–Demand Multimedia Service." IEEE Communications Magazine, vol. 30, No. 7, Jul. 1992, US, pp. 56–64, See p. 61, line 9—line 51.

Gopal, I., et al., "Multicasting to Multiple Groups over Multicast Channels." Computer Networking Symposium, Apr. 1988, USA. See p. 79, left col., line 21—p. 80, left col., line 5.

Rangan, P. Venkat, et al., "Software Architectures for Integration of Video Services in the Etherphone System." IEEE Journal on Selected Areas in Communication, vol. 9, No. 9, Dec. 1991, New York, US, pp. 1395–1404.

Lauren Weinstein, "Project Stargate," 1985 The USENIX Association, pp. 79–80.

Frequently Asked Questions on the Multicast Backbone (MBone) by Steve Casner, Jan. 16, 1993.

* cited by examiner

FIG. 15. SERVER

FIG. 16. SERVER SOFTWARE ARCHITECTURE

FIG. 17. CLIENT

FIG. 18. CLIENT SOFTWARE ARCHITECTURE

FIG. 19. SERVER SUBSYSTEM DATA FLOW

FIG. 20. CLIENT SUBSYSTEM DATA FLOW

FIG. 21. NETWORK INPUT/OUTPUT DRIVER

FIG. 22. DATA LINK MANAGER (DLM)

FIG. 23. MEDIA DEPENDENT MODULE (MDM)

FIG. 25. LEVEL 1 AUDIO PACKET
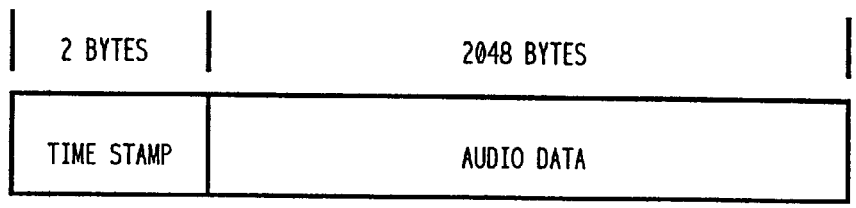
FIG. 26. LEVEL 1 VIDEO PACKET
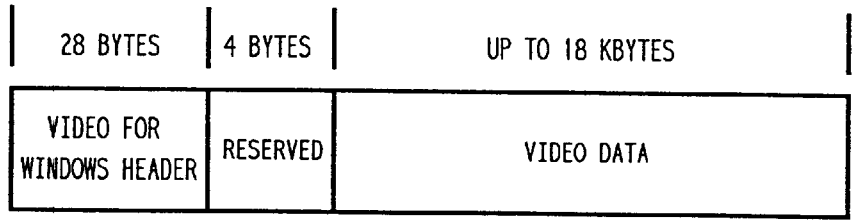
FIG. 27. LEVEL 1 TEXT PACKET
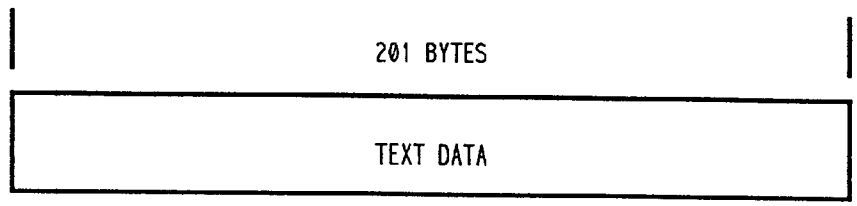

FIG. 28. LEVEL 3 (LINK) PACKET
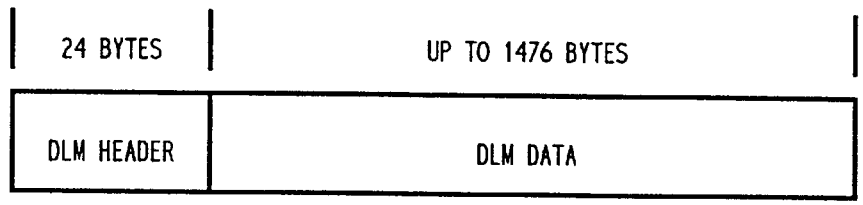
FIG. 29. LEVEL 3 (LINK) PACKET HEADER
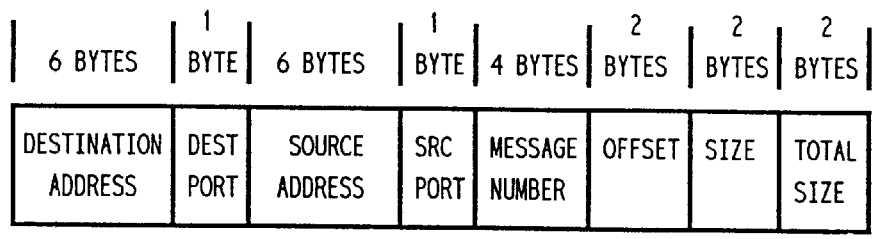
FIG. 30. LEVEL 5 (NETWORK) PACKET
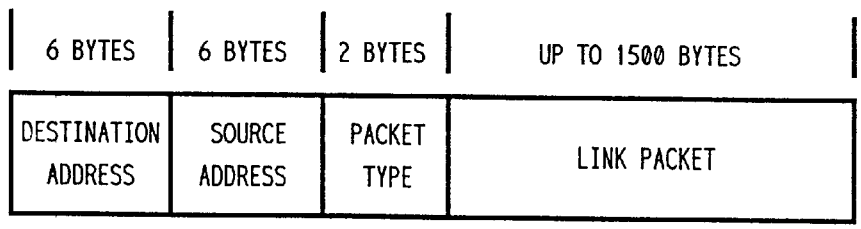

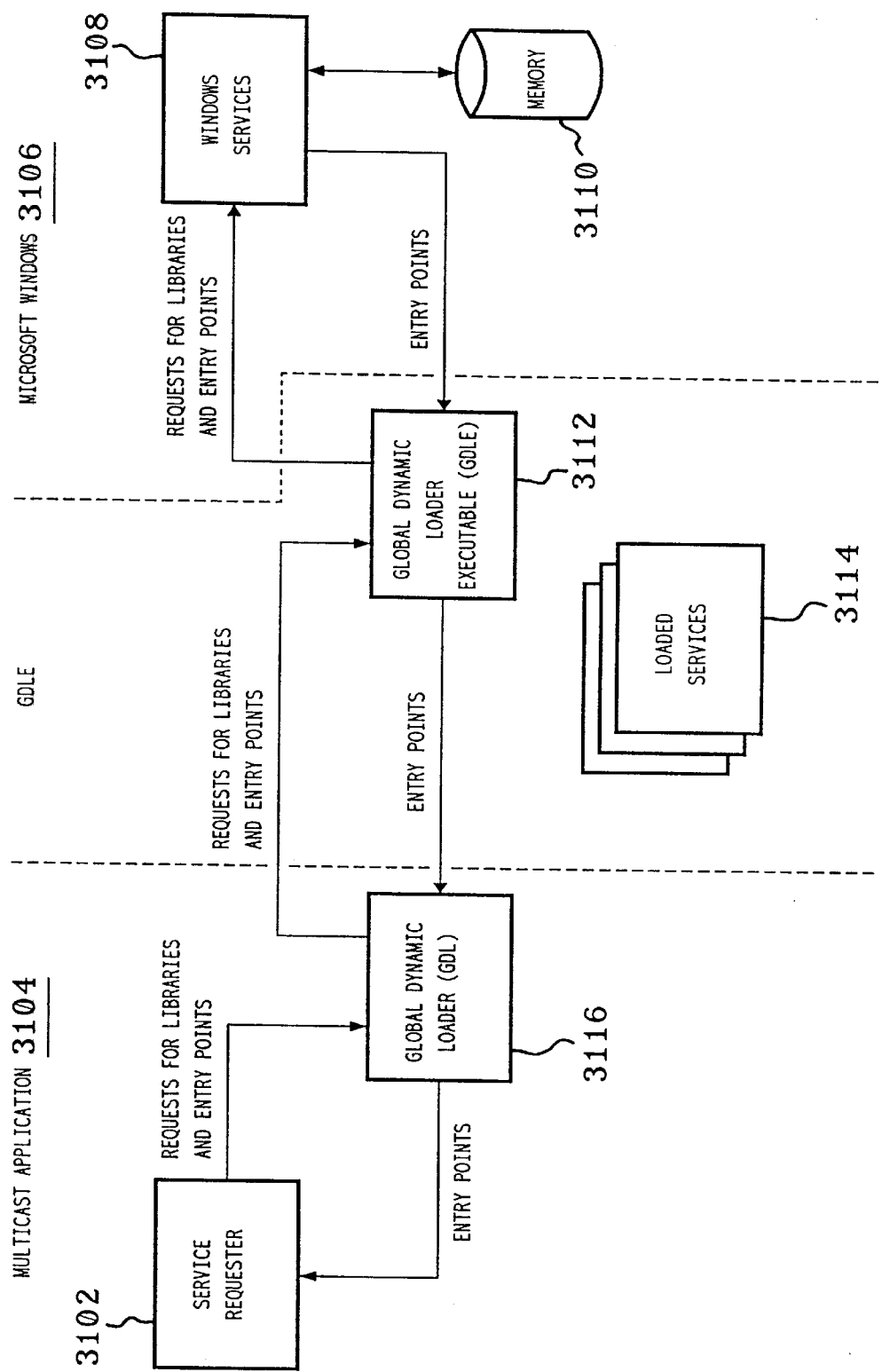
FIG. 31. GDL/GDLE SCHEME

SERVER/CLIENT ARCHITECTURE AND METHOD FOR MULTICASTING ON A COMPUTER NETWORK

BACKGROUND OF THE INVENTION

1. Field of the Invention

The present invention relates to multicasting, and, in particular, to servers, clients, and methods for multicasting on a computer network.

2. Description of the Related Art

In multicasting, one or more sources transmit a plurality of data signals for potential receipt by one or more receivers in a network. Only one copy of each data signal is transmitted. Each receiver selects which if any of the plurality of signals to receive and process.

Multicasting differs from point-to-point communication, multipoint communication without multicasting, and broadcasting. In point-to-point communication, one copy of data is selectively transmitted from one source to one receiver. In multipoint communication without multicasting, data is copied multiple times, one copy of which is transmitted to each of a set of multiple receivers. In broadcasting, each data signal is transmitted to every receiver in the network without giving the receiver the ability to select only a subset of those transmitted signals to be received.

It is desirable to provide multicasting on a computer network. It is particularly desirable to provide a system for transmitting audio, video, and text data streams for selective receipt by one or more client computers of a computer network. For example, a user would be able to select a television channel comprising audio and video signals for play on the client computer. The user would also preferably be able to control certain aspects of the play of the selected signal. For example, the user would be able to control the volume of the audio component and the size of the display of the video component. Moreover, the user would be able to select a subset of the components of a selected channel for play (e.g., playing only the audio component of a television channel).

It is also desirable that the multicast system support data streams that are received from an external source (e.g., via air transmission or cable) or from a local source (e.g., a VCR). When the client computer provides a windowed environment (such as that provided by Microsoft Windows), the multicast system preferably allows a user to work in one window while the selected video and/or text are displayed in one or more other windows.

The Internet MBONE multicast backbone system is a semi-permanent multicast testbed. MBONE is a virtual network. It is layered on top of portions of the physical Internet to support routing of multicast packets since that function is not integrated into many production routers. The network is composed of islands that can directly support multicast, such as multicast local area networks (LANs) like Ethernet, linked by point-to-point links called "tunnels". The tunnel endpoints are typically workstation-class machines having operating system support for multicast and running the multicast routing daemon.

However, the MBONE system does not provide high-quality multicasting. Audio signals are subject to unacceptable delays that result in non-real-time play at the client computers. In addition, audio and video signals are not related. As a result, the play of audio signals is not synchronized with the play of video signals. The multicasting is therefore of low quality. Moreover, MBONE does not allow the user to select components and control aspects of the selected signal. Furthermore, MBONE does not support the play of a selected signal in a windowed environment.

It is accordingly an object of this invention to overcome the disadvantages and drawbacks of the known art and to provide methods and apparatuses for multicasting multiple signals on a computer network.

It is a further object of the present invention to provide high-quality multicasting of audio, video, and text data streams on a computer network.

It is a further object of the present invention to provide multicasting on a computer network wherein a user may select components of a selected channel for play.

It is a further object of the present invention to provide multicasting on a computer network wherein a user may control certain aspects of the play of a selected channel.

It is a further object of the present invention to provide multicasting on a computer network having client computers that operate in a windowed environment.

Further objects and advantages of this invention will become apparent from the detailed description of a preferred embodiment which follows.

SUMMARY OF THE INVENTION

According to a preferred embodiment, the present invention is a client for a network-based multicast system. The client comprises a media services manager and one or more media service providers. The media services manager receives data from the network for a selected channel, where the channel comprises one or more related data streams. The one or more media service providers receive and play the data from the media services manager, where each media service provider receives and plays data corresponding to a data stream of the channel.

According to an alternative preferred embodiment, the present invention is a server for a network-based multicast system. The server comprises a media services manager and one or more media service providers. The one or more media service providers receive data corresponding to a channel, where the channel comprises one or more related data streams. Each media service provider receives data corresponding to a data stream of the channel. The media services manager receives the data from the media service providers and transmits the data to the network.

BRIEF DESCRIPTION OF THE DRAWINGS

Other objects, features, and advantages of the present invention will become more fully apparent from the following detailed description of the preferred embodiment, the appended claims, and the accompanying drawings in which:

FIGS. 25, 26, and 27 are representations of Level 1 audio, video, and text data packets, respectively, of the multicast system of FIG. 1;

FIG. 28 is a representation of a Level 3 data packet of the multicast system of FIG. 1;

FIG. 29 is a representation of the 24-byte DLM header of the Level 3 data packet of FIG. 28;

FIG. 30 is a representation of a Level 5 data packet of the multicast system of FIG. 1;

FIG. 31 is a block diagram of the software architecture of each of the server and clients of the multicast system of FIG. 1 for loading and unloading of service libraries.

DESCRIPTION OF THE PREFERRED EMBODIMENT(S)

Figure 1:
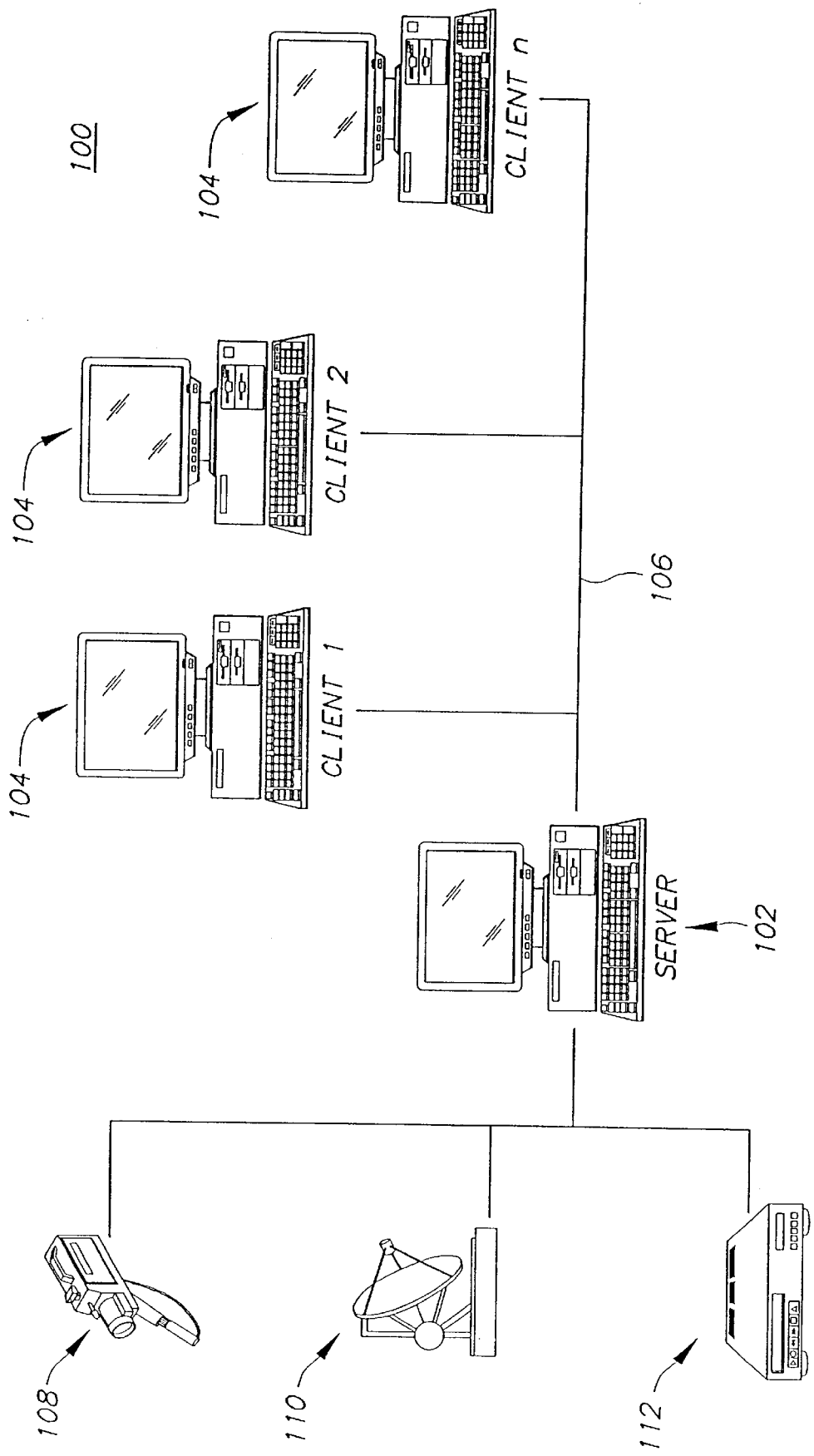
FIG. 1 is a representation of a multicast system for multicasting multiple, related data streams on a computer network, according to a preferred embodiment of the present invention.

Referring to FIG. 1, there is a representation of multicast system 100 for multicasting multiple, related data streams on a computer network, according to a preferred embodiment of the present invention. Multicast system 100 comprises a single server 102 and multiple clients 104 linked by network 106. Server 102 captures and posts data on network channels, with any number of clients 104 independently selecting channels for receipt and play.

Server 102 is capable of capturing analog audio and video signals from three different sources: (1) signals generated locally by camera 108, (2) signals received by antenna 110 from a remote source, and (3) recorded signals from VCR 112. In addition, server 102 may receive digital text signal from a remote source (not shown) (e.g., via modem). Server 102 may receive multiple signals of each type (i.e., audio, video, or text) from one or more sources at the same time.

For example, server 102 may receive via antenna 110 a first television program consisting of three signals: video, English language audio, and Spanish language audio. At the same time, server 102 may receive a second television program consisting of video and English language audio from VCR 112. Server 102 may also concurrently receive the audio signal for a radio station via antenna 110 and a text stream via modem.

Server 102 digitizes the received analog audio and video signals to generate digital audio and video data streams. Server 102 selectively relates the digital audio, video, and text data streams together to form specified channels. A channel is a logical representation of a specific collection of data streams transmitted over the network. For example, the video and English audio data streams of the first television program may be related together to form a first channel. That same video data stream may be related to the Spanish audio data stream to form a second channel. In addition, the video and English audio data streams of the second television program and the text data stream may be related to form a third channel. The audio data stream for the radio station may constitute a fourth channel by itself.

Server 102 fragments each data stream into network data packets for transmission over network 106. Server 102 transmits a single copy of each of the network data packets for all four channels over network 106 for potential receipt by clients 104. Each client 104 independently and optionally selects any one of the four channels. When a client 104 selects a channel, the client may receive and process the network data packets corresponding to the data streams of the selected channel. Thus, system 100 is a multicasting system that provides multicasting of one or more channels from server 102 to one or more clients 104. A preferred embodiment of a user interface for multicast system 100 as well as the options provided to a user via that interface are described in further detail later in this specification in conjunction with FIG. 2.

Server 102 and clients 104 may be any suitable computers and are preferably personal computers having an Intel® i486-based central processing unit (CPU) running Microsoft Windows. Server 102 and clients 104 are preferably sound enabled with a SoundBlaster Pro from Creative Labs, network enabled with an Intel® Ether Express 16 card, and video enabled with Intel® SmartVideo® Recorders (ISVR). Network 106 is preferably an Ethernet network.

User Interface

Figure 2:
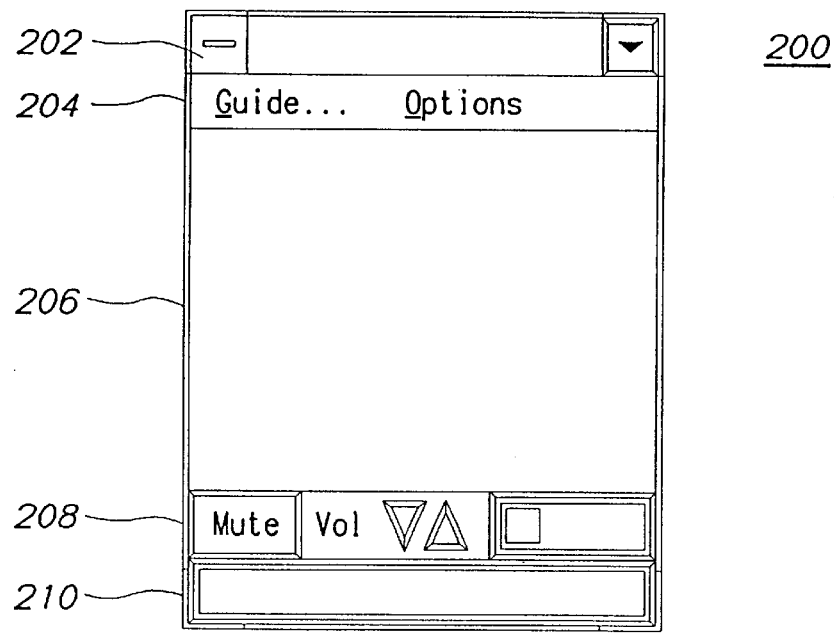
FIG. 2 shows a preferred embodiment of the user interface as displayed on the monitor of a client of the multicast system of FIG. 1.

Referring now to FIG. 2, there is shown a preferred embodiment of the user interface 200 that is displayed on the monitor of a client 104 of the multicast system 100 of FIG. 1. In a preferred embodiment, client 104 operates in a windowed environment, such as that provided by Microsoft Windows. User interface 200 is a window frame comprising window controls 202, channel controls 204, video display 206, audio controls 208, and text reader bar 210.

The video component (if any) of a selected channel is displayed in video display 206 and the text component (if any) of the selected channel is displayed in text reader bar 210. Preferably using a computer mouse, a user may use audio controls 208 to control the play of the audio component (if any) of the selected channel. Controlling the audio play includes increasing or decreasing the volume or muting the sound completely. Audio controls 208 also displays a volume meter for depicting the current volume level.

Those skilled in the art will understand that a user may use window controls 202 to close (i.e., terminate the display of) user interface 200 and to control the size and position of user interface 200. User interface 200 may be moved around the display raster by dragging either window controls 202, video display 206, or text reader bar 210 using the mouse. Channel controls 204 provides the user with the ability to select a channel and to control certain aspects of the play of the selected channel.

Multicast system 100 supports three types of data streams (audio, video, and text). A channel may comprise any combination of data streams. The user is able to select how to configure the play of a selected channel (e.g., play only the audio component of a channel having both audio and video components). Moreover, the user may change the selected channel configuration and various aspects of the channel (e.g., size of video display 206 or volume of audio play) at any time. Certain channels may be marked as password protected and/or as pay-per-view. In those cases, the user would have to enter the correct password and/or a valid credit card number depending upon the nature of the channel.

Program Guide of the User Interface

Figure 3:
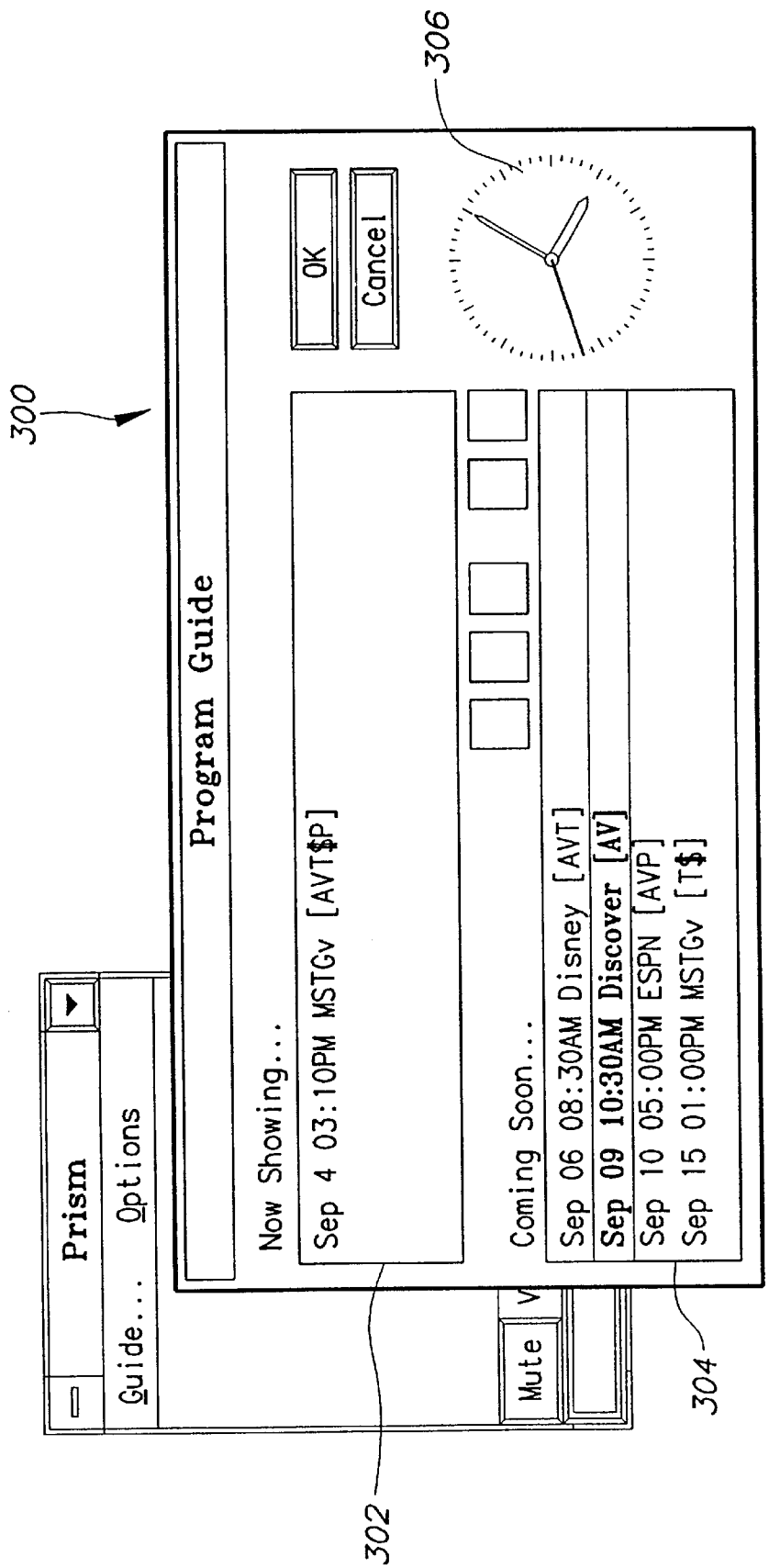
FIG. 3 shows an example of a preferred embodiment of the Program Guide window displayed when the user selects the Guide option in the channel controls of the user interface of FIG. 2.

Referring now to FIG. 3, there is shown an example of a preferred embodiment of the Program Guide window 300 created when the user selects the Guide option in channel controls 204 of user interface 200 of FIG. 2. Program Guide window 300 comprises a list 302 of the channels currently being transmitted over the computer network and a list 304 of the channels to be transmitted over the computer network in the future. Program Guide window 300 also preferably displays the current time in clock 306.

Each entry in lists 302 and 304 of Program Guide window 300 identifies the date, start time, and name (e.g., television channel name or program name) of the transmission. The entry also provides (in brackets) information about the components of the channel, where the letters A, V, and T indicate that the channel has audio, video, and text components, respectively.

Figure 4:
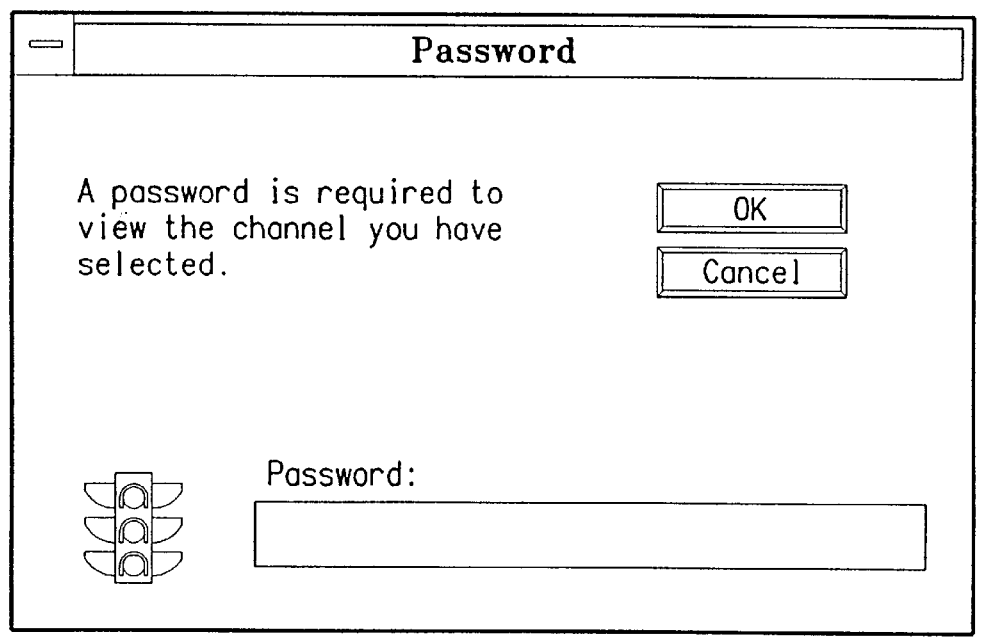
FIG. 4 shows a preferred embodiment of the Password window created when the user selects a channel that requires the entry of a password.

The letter P indicates that the user must enter a special password in order to play the selected channel. Referring to FIG. 4, there is shown a preferred embodiment of the Password window created when the user selects a channel that requires the entry of a password. The user uses the Password window to enter the special password for the program.

Figure 5:
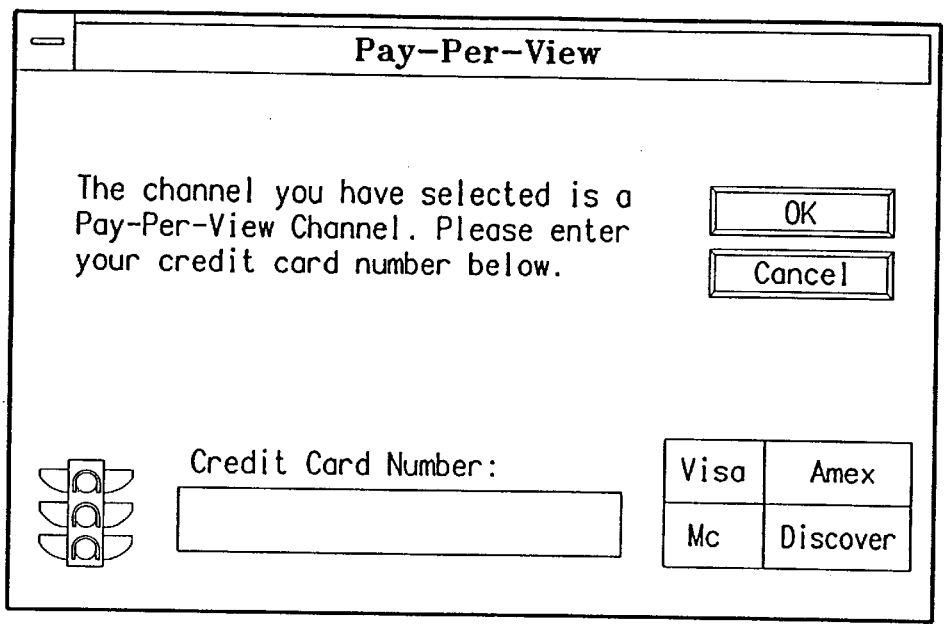
FIG. 5 shows a preferred embodiment of the Pay-Per-View window created when the user selects a channel that requires payment.

The symbol $ indicates that the user must pay in order to play the selected channel. Referring to FIG. 5, there is shown a preferred embodiment of the Pay-Per-View window created when the user selects a channel that requires payment. The user uses the Pay-Per-View window to enter a credit card number to which to charge the payment for the program.

Figure 6:
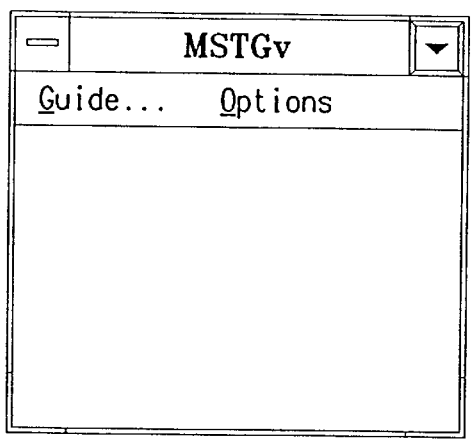
FIGS. 6, 7, and 8 show preferred embodiments of the user interface of FIG. 2 for selected channels consisting of only video, only audio, and only text, respectively.

After the user selects a desired channel, the Program Guide window 300 is closed and user interface 200 is configured in accordance with the components of the selected channel. For example, referring now to FIGS. 6, 7, and 8, there are shown preferred embodiments of the user interface 200 for selected channels consisting of only video, only audio, and only text, respectively.

Options Menu of the User Interface

Figure 9:
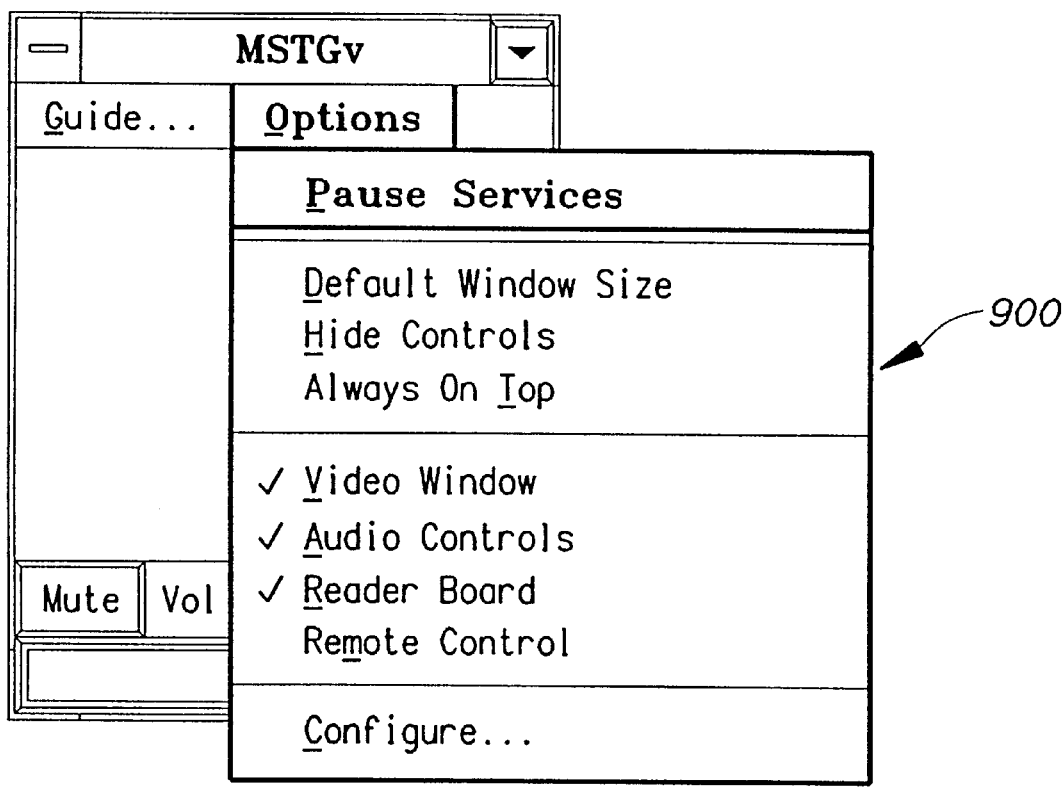
FIG. 9 shows a preferred embodiment of the Options menu created when the user selects the Options option in the channel controls of the user interface of FIG. 2.

Referring now to FIG. 9, there is shown a preferred embodiment of the Options menu 900 created when the user selects the Options option in channel controls 204 of user interface 200 of FIG. 2. Options menu 900 provides controls for the user to customize the component configuration and other aspects of the window.

When selected, the Pause Services item of Options menu 900 pauses reception of all currently active data streams all the way down to the network level. When implemented in the preferred windowed environment, multicast system 100 allows a client 104 to play a selected channel in one window, while the client 104 concurrently works in another window. Pause Services allows a user to suspend the multicasting functions performed by client 104 in order to accelerate a network, disk, or CPU intensive job also being handled by client 104.

When Pause Services is selected, many of the channel and audio controls are preferably disabled, although the user may change the position of the user interface and perform other window-related operations. The Pause Service menu item toggles the application back and forth between paused and unpaused states. A check mark is preferably displayed next to the menu item to indicate that service is paused.

The user may shrink or enlarge video display 206 of user interface 200 by selecting and dragging a corner or side of video display 206 with the mouse. When selected, the Default Window Size item of Options menu 900 returns user interface 200 to its specified default window size as dictated by the default size for video display 206 (preferably 160 pixels wide by 120 pixels high). The maximum size of video display 206 is preferably 320 pixels wide by 240 pixels high and the minimum size is preferably 120 pixels wide by 90 pixels high. The aspect ratio of video display 206 is preferably always preserved.

Figure 10:
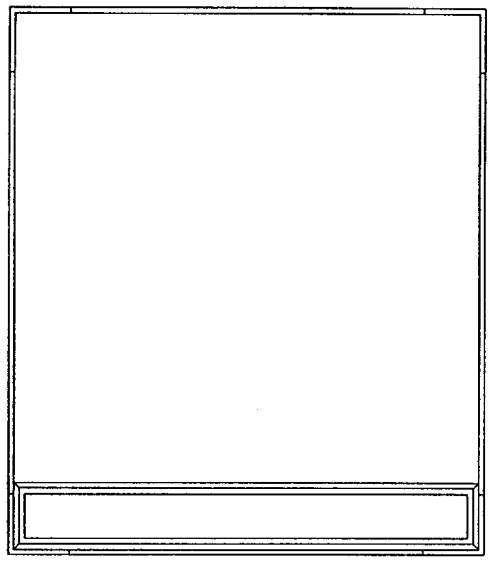
FIGS. 10, 11, and 12 show preferred embodiments of the user interface of FIG. 2 when video and text, video only, and text only, respectively, are selected for display with controls hidden.
Figure 11:
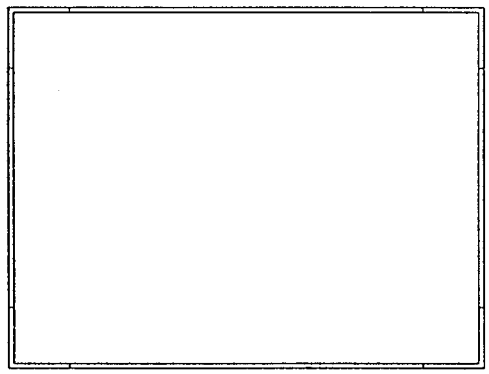
Figure 12:
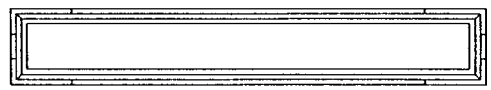

When selected, the Hide Controls item of Options menu 900 hides (i.e., terminates the display of) window controls 202, channel controls 204, and audio controls 208 of user interface 200. The controls are redisplayed by double clicking on either video display 206 or text reader bar 210. As such, the Hide Controls menu item is only enabled when at least one of video display 206 and text reader bar 210 is displayed. Referring now to FIGS. 10, 11, and 12, there are shown preferred embodiments of the user interface 200 when video and text, video only, and text only, respectively, are selected for display with controls hidden.

The Always On Top item of Options menu 900 toggles the application to and from being TopMost in the Microsoft Windows Z-Order. When a window is TopMost, it always remains in view on top of all other open windows. The user may select Always On Top when the user does not want the multicasting application to be buried by other windows. A check mark is displayed next to the menu item when the Always On Top item is selected.

The Video Window item of Options menu 900 is used to display or hide video display 206 of user interface 200. For example, the user may choose to play only the audio component of a selected channel having both video and audio components. A check mark is displayed next to the Video Window menu item when video display 206 is visible.

Figure 7:
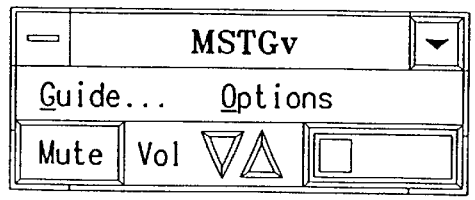
Figure 8:
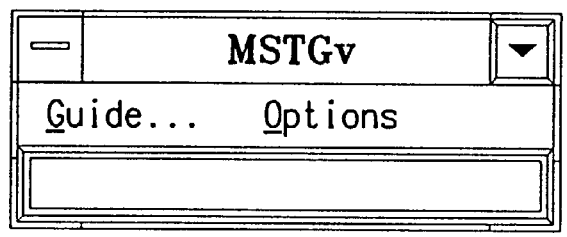

The Audio Controls item of Options menu 900 is used to display or hide audio controls 208 of user interface 200. Audio controls 208 preferably cannot be hidden when neither video display 206 nor text reader bar 210 is visible, since nothing would be visible other than the window frame. As depicted in FIG. 7, audio controls 208 preferably has a fixed height, but may be sized from a minimum width of 120 pixels to a maximum width of 320 pixels. A check mark is displayed next to the Audio Controls menu item when audio controls 208 is visible.

The Reader Board item of Options menu 900 is used to display or hide text reader bar 210 of user interface 200. For example, the user may choose to play only the audio and video components of a selected channel having audio, video, and text components. A check mark is displayed next to the Reader Board menu item when text reader bar 210 is visible.

Figure 13:
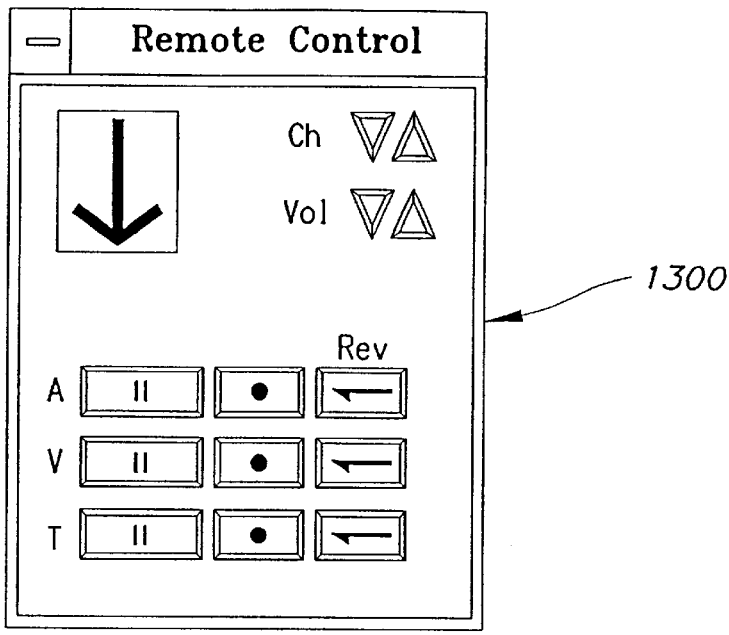
FIG. 13 shows a preferred embodiment of the remote control window that is created when the Remote Control item of the Options menu of the user interface of FIG. 2 is selected.

Referring now to FIG. 13, there is shown a preferred embodiment of the remote control window 1300 that is created when the Remote Control item of Options menu 900 is selected. Remote control window 1300 is a dialog window that provides functions analogous to those of a standard television remote control. Remote control window functions include changing channels; changing audio volume; and playing, recording, or rewinding the audio, video, or text components of the current channel. The Remote Control menu item is preferably disabled when a remote control window 1300 is open to prevent multiple instances of remote control windows for the same channel at the same time.

Figure 14:
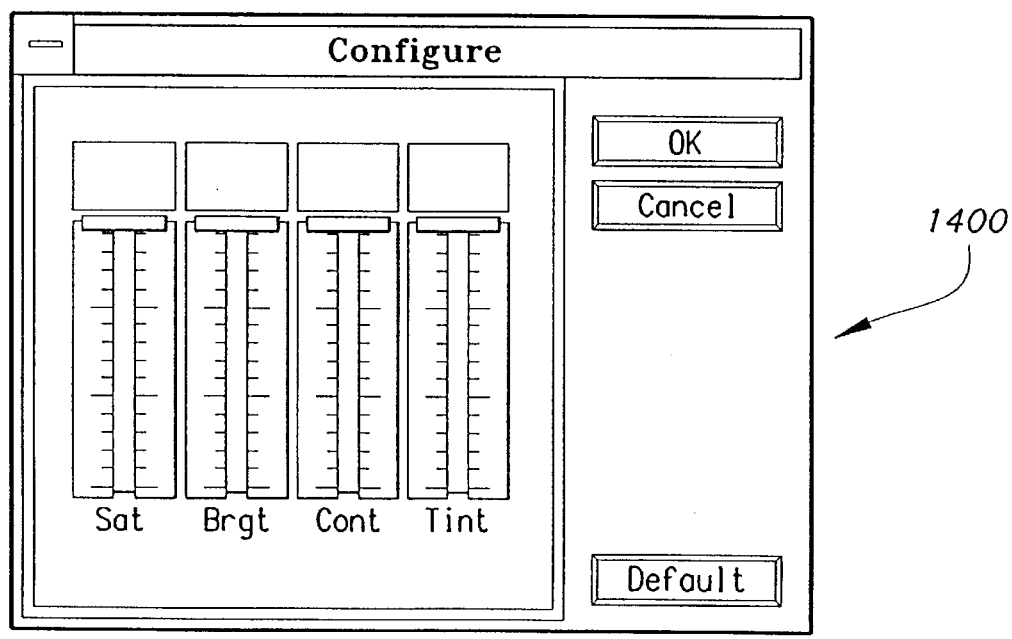
FIG. 14 shows a preferred embodiment of the configure window that is created when the Configure . . . item of the Options menu of the user interface of FIG. 2 is selected.

Referring now to FIG. 14, there is shown a preferred embodiment of the configure window 1400 that is created when the Configure . . . item of Options menu 900 is selected. Configure window 1400 is a dialog window that provides specific video controls such as saturation level, brightness, contrast, and tint. In an alternative preferred embodiment, configure window 1400 also provides specific audio controls such as mix and quality settings and specific text controls such as scroll speed and freeze scroll. The Configure . . . menu item is preferably disabled when a configure window 1400 is open to prevent multiple instances of configure windows for the same channel at the same time.

Server Subsystem

Figure 15:
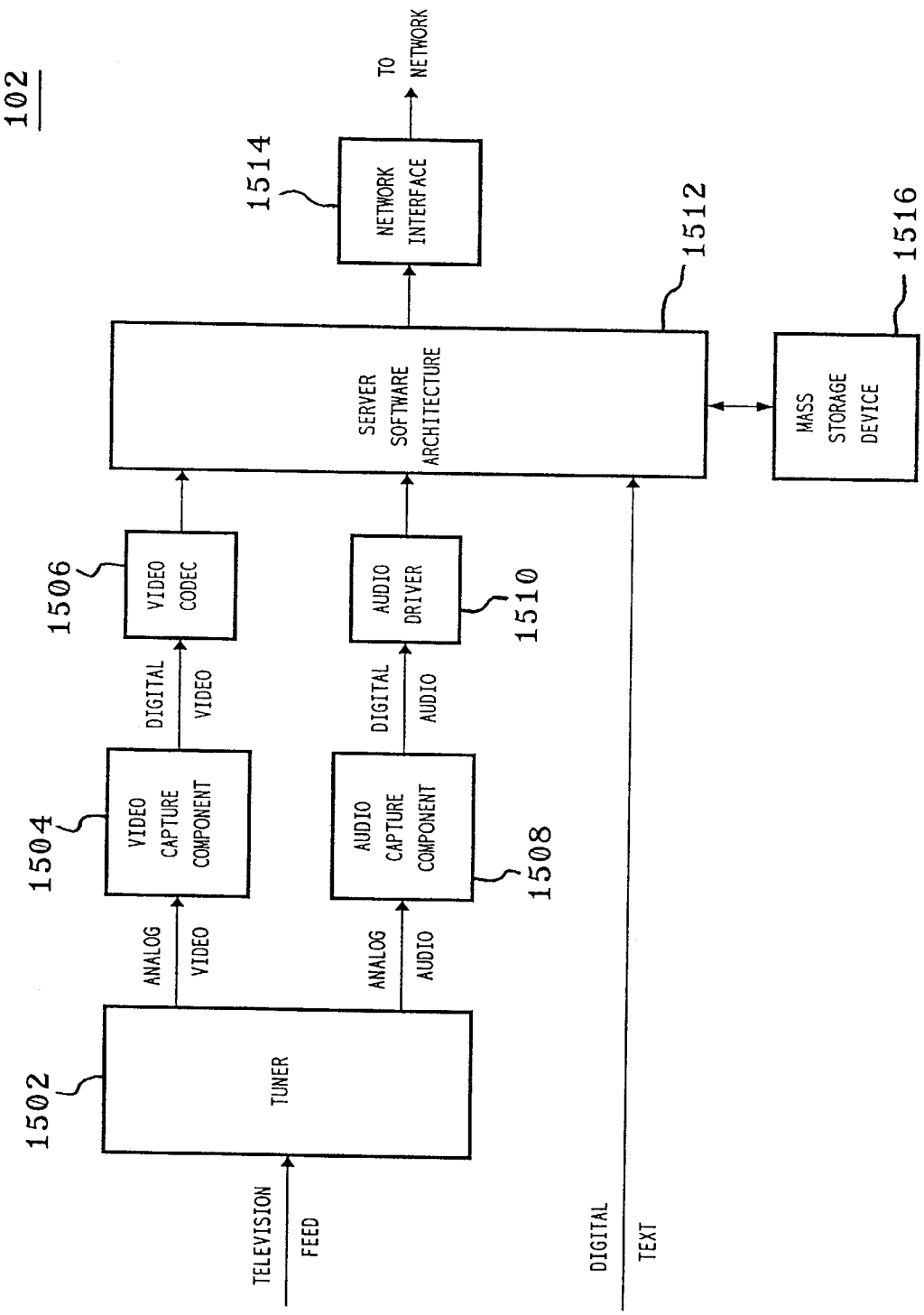
FIG. 15 is a block diagram of the server subsystem of the multicast system of FIG. 1.

Referring now to FIG. 15, there is shown a block diagram of server 102 of multicast subsystem 100 of FIG. 1, according to a preferred embodiment of the present invention. Server 102 receives analog audio and video signals and digital text signals and transmits digital data packets corresponding to those signals over the network for receipt by clients 104.

In particular, tuner 1502 of server subsystem 102 receives, demodulates, and splits one or more analog television feed signals into their constituent analog audio and video signals. Video capture component 1504 captures and converts the analog video signals into digital video data streams. Similarly, audio capture component 1508 captures and converts the analog audio signals into digital audio data streams. Those skilled in the art will understand that the source of the analog audio and video signals may vary depending on the particular embodiment of the present invention. Possible sources of analog signals include cable television, radio or television air-wave signals, video cameras, and VCRs. It will also be understood that, in alternative preferred embodiments, server 102 may receive, capture, and convert analog text signals into digital text streams.

Video codec 1506 compresses the digital video data streams and transmits the compressed video data streams to server software architecture 1512. Audio driver 1510 places the audio data into buffers and transmits the audio data buffers to server software architecture 1512. Server software architecture 1512 receives the audio, video, and text data streams, relates selected data streams together to form channels, fragments each data stream into network data packets, and transmits the network data packets to network interface 1514 for transmission over the network.

Server 102 also supports the recording of data to mass storage device 1516 with or without concurrent multicasting of the data to the network. In addition, server 102 supports multicasting of recorded data previously stored in mass storage device 1516.

Tuner 1502 may be any suitable device for demodulating and splitting analog television feed signals and is preferably a VCR. Video capture component 1504 and codec 1506 may be any suitable hardware/software device or devices for capturing and compressing video and are preferably components of an Intel® SmartVideo® Recorder (ISVR). Audio capture component 1508 may be any suitable device for capturing and digitizing analog audio signals and is preferably a Creative Labs SoundBlaster Pro.

Audio driver 1510 may be any suitable hardware/software device for processing audio data and is preferably a Microsoft Wave Driver (i.e., a Microsoft Windows Audio Device Driver corresponding to the Microsoft WAV Specification). Server software architecture 1512 is implemented on any suitable computer such as a personal computer with an Intel® i486 microprocessor. Server software architecture 1512 is described in further detail later in this specification in conjunction with FIG. 16. Network interface 1514 is any compatible device for interfacing with the network. For example, when the network is an Ethernet network, network interface 1514 may be an Intel® Ether Express 16 card with suitable software (e.g., Novell Link Support Layer (LSL) under the Novell Open Data-Link Interface (ODI)).

Server Subsystem Software Architecture

Figure 16:
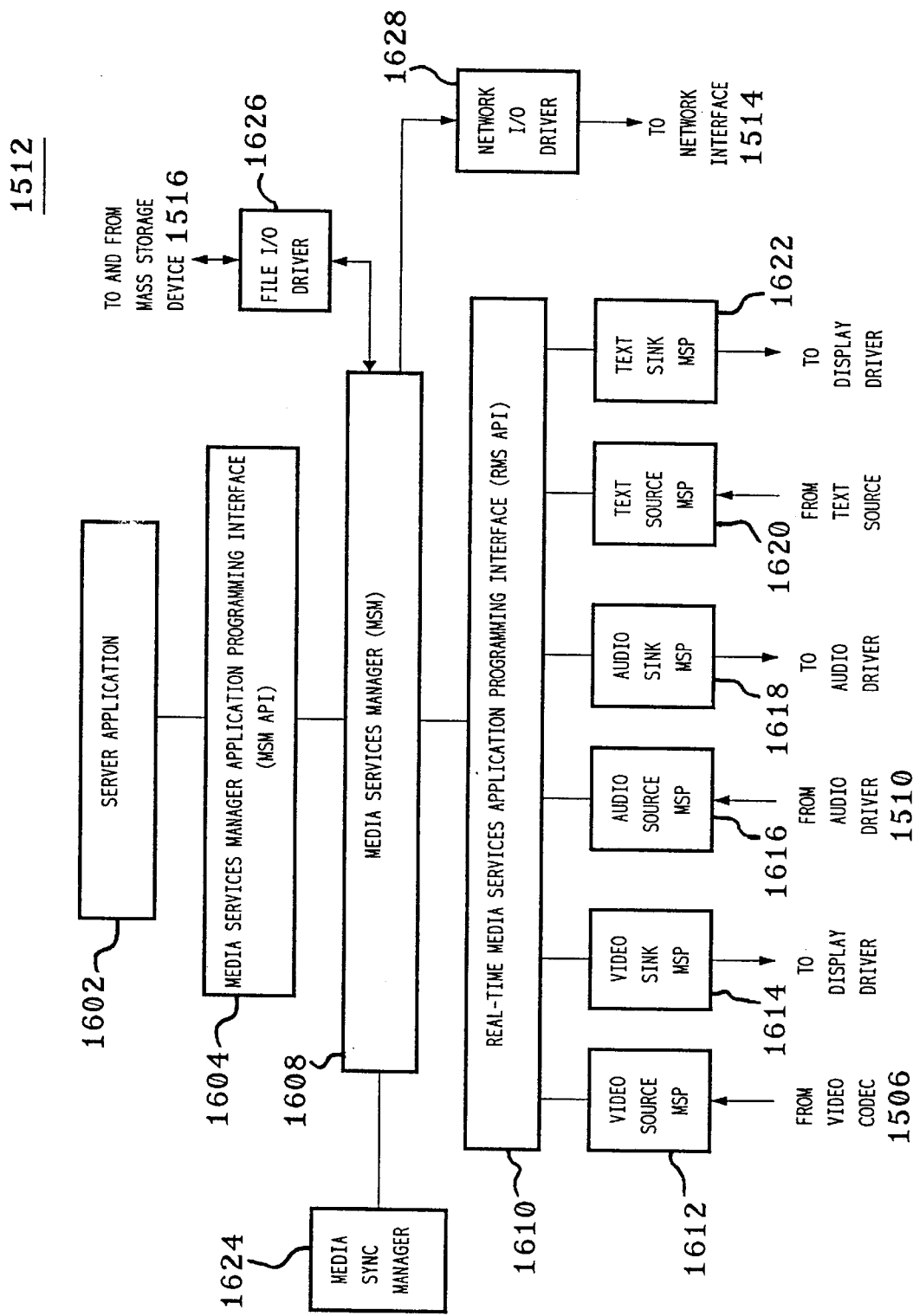
FIG. 16 is a block diagram of the software architecture of the server subsystem of FIG. 15.

Referring now to FIG. 16, there is shown a block diagram of server software architecture 1512 of server 102 of FIG. 15, according to a preferred embodiment of the present invention. Server software architecture 1512 comprises server application 1602, media services manager (MSM) 1608, media sync manager 1624, file input/output (I/O) driver 1626, network I/O driver 1628, and a plurality of media service providers (MSPs) 1612–1622. Server application 1602 and MSM 1608 communicate using the system-level protocol MSM application programming interface (API) 1604. MSM 1608 and the MSPs communicate using the system-level protocol real-time media services API 1610.

Server application 1602 of server software architecture 1512 allows an administrator of multicast system 100 to define the configuration and destinations of channels. That is, server application 1602 is used to select:

which data streams are to be related together as channels,
whether to transmit the channels to the network or store the channels to mass storage device 1516 or both,
whether to transmit channel programs stored in mass storage device 1516, and
whether to play any of the selected data streams locally to monitor the multicasting services.

Server application 1602 asks media services manager (MSM) 1608 to gather and deliver various types of data on one or more channels over the network.

Media services manager (MSM) 1608 manages the flow of data through server software architecture 1512 as specified by server application 1602. Data may flow through MSM 1608 over the following data paths:

From a source media service provider (MSP) to the network (for multicasting of data received from an external source), From a source MSP to a local sink MSP (for monitoring the processing of data received from an external source), From a source MSP to mass storage device 1516 (for storage of data received from an external source for subsequent processing), From mass storage device 1516 to the network (for multicasting of locally recorded data), and From mass storage device 1516 to a local sink MSP (for monitoring the processing of locally recorded data).

MSM 1608 recognizes the available source and sink MSPs and is responsible for initializing and configuring the MSPs for the defined channels. MSM 1608 has no knowledge about the actual type or format of the data flowing through it. Server application 1602, MSM 1608, and the MSPs provide channel configuration capabilities both before and during channel transmission. MSM 1608 is designed to be modified to support new features without significant changes in the rest of server software architecture 1512.

There are (at least) two types of media service providers (MSPs): source MSPs and sink MSPs. A source MSP is a media service provider that assists in the receipt of a data stream from an external source or local mass storage device. A sink MSP is a media service provider that assists in the local playing or recording of a data stream. MSPs are further categorized by media type. Thus, multicast system 100 supports audio, video, and text source MSPs and audio, video, and text sink MSPs. MSM 1608 may be modified to support MSPs in addition to audio, video, and text MSPs.

Video source MSP 1612 receives a video data stream from video codec 1506 of FIG. 15 and transmits the video data to MSM 1608. Similarly, audio source MSP 1616 and text source MSP 1620 receive audio and text data streams from audio driver 1510 and the text source, respectively, and transmit the audio and text data to MSM 1608. Server software architecture 1512 also preferably has video, audio, and text sink MSPs 1614, 1618, and 1622 to provide local monitoring capabilities. The processing of sink MSPs is described in further detail later in this specification in conjunction with FIG. 18 and the discussion of the client software architecture.

Server application 1602 communicates with MSM 1608 using application-level MSM application programming interface (API) 1604. MSM API 1604 supports the following function calls by server application 1602:

MSM_InitServices( ): Initializes and configures media service providers (MSPs) to be used; initializes either file or network input/output (I/O) system; specifies whether application is a server or a client.

MSM_StartServices( ): Starts (or unpauses) any or all of the MSPs that were initialized.

MSM_StopServices( ): Stops (or pauses) any or all of the MSPs that were initialized.

MSM_TerminateServices( ): Terminates all of the MSPs that were initialized; terminates network or file I/O in use.

MSM_ConfigureServices( ): Dynamically configures any or all of the MSPs in use.

MSM API 1604 allows new applications to be developed on top of MSM 1608.

MSM 1608 uses file I/O driver 1626 to store and retrieve data to and from mass storage device 1516. File I/O driver 1626 supports the following function calls:

InitFileOut( ): Called by the MSM to prepare for sending data packets to a data file in mass storage device 1516.

WriteFile( ): Posts data packets to the FileIOWndProc( ) function to write a data packet to the data file at task time. Since data cannot be written to a file in interrupt context, the WriteFile( ) function posts data packets to a file-IO window. When Windows gives the file-IO window a chance to process its messages, the data packets will be written to the file by the FileIOWndProc( ) function.

FileIOWndProc( ): Writes data packets to the file at task time.

RecycleBuffer( ): Called by file I/O driver 1626 to give MSP buffers back to the MSM after the data have been written to the data file. This function preferably resides in the MSM.

TerminateFileOut( ): Closes the output file.

InitFileIn( ): Called by the MSM to prepare for reading data packets from a data file in mass storage device 1516.

ReadFileTimerProc( ): Called by Windows to read a new data packet from the file. File I/O driver 1626 creates a system time to cause data packets to be read from the file on a regular interval.

WriteBuffer( ): Called by file I/O driver 1626 to inform the MSM that a new data packet has been read from the file. This function preferably resides in the MSM. In response, the MSM delivers the new data packet to the appropriate MSP to be played.

TerminateFileIn( ): Closes the input file.

The data file format for multicast system 100 includes a file header and some number of data blocks. Each data block comprises a block header (specifying the type and size of the data) and a data packet of the specified size. Only the MSPs know the format of the data packets. A data file may contain any number of data blocks of different types and sizes. Those skilled in the art will understand that data is written to and from mass storage device 1516 via sink and source MSPs.

MSM 1608 and an MSP communicate using real-time media service (RMS) API 1610. RMS API 1610 is a system-level protocol used by MSM 1608 to control the acquisition, synchronization, and playing of data via the MSPs. Any element in server software architecture 1512 capable of capturing, playing, transporting, or storing some form of data, in real time, is considered to be a media service provider if it conforms to the RMS API standard. RMS API 1610 consists of one group of function calls that an MSP exports for the MSM to call and two groups of function calls that the MSM exports for MSPs to call (media synchronization calls and buffer management calls).

When the server application calls the MSM_InitServices function, the MSM uses the global dynamic loader (GDL) to load each MSP that will be used during the multicast session. The GDL resolves the RMS API entry points in an MSP and stores the procedure addresses in a different MSP control structure for each instance of every MSP. The GDL is described in further detail later in this specification in conjunction with FIGS. 31 and 32.

RMS API 1610 supports the following function calls by MSM 1608 into an MSP (either source or sink):

OpenService( ): Initializes/configures an MSP for MSM 1608 to use.

StartService( ): Starts (or unpauses) an MSP.

StopService( ): Stops (or pauses) an MSP.

CloseService( ): Terminates an MSP when no longer needed.

ConfigureService( ): Configures an MSP as specified by the application.

RecycleBuffer( ): Notifies a source MSP that MSM 1608 has completed sending one of the source MSP's buffers.

WriteData( ): Notifies a sink MSP that MSM 1608 has data for the sink MSP to play.

RMS API 1610 supports the following media synchronization function calls by an MSP to MSM 1608:

NewSyncStamp( ): Source MSP requests the current time from MSM 1608.

StartSyncClock( ): Sink MSP informs MSM 1608 that the sink MSP is running and valid for synchronization.

StopSyncClock( ): Sink MSP informs MSM 1608 that the sink MSP is not valid for synchronization.

TestSyncState( ): Sink MSP requests MSM 1608 to determine whether a data packet is early, in sync, or late.

RMS API 1610 supports the following buffer management function calls by an MSP to MSM 1608:

ReceiveData( ): Source MSP informs MSM 1608 that there is new data to send to the network.

RegisterBuffer( ): Sink MSP registers all of the sink MSP buffers with MSM 1608 as available at time of initialization.

WriteDataComplete( ): Sink MSP informs MSM 1608 that the sink MSP has completed playing a buffer and that the buffer is therefore available to receive new data.

In addition, MSPs can use custom window messages to communicate with the application.

Media sync manager 1624 provides time stamps for the component data streams. Any type of data may be synchronized with any other type as long as the source MSPs stamp their data with the appropriate capture time. Although it is possible to synchronize multiple media types (i.e., data streams), preferably only one sink MSP is defined to be the sync target, to which the other MSPs of the channel are related. Media synchronization is described in further detail later in this specification in a section entitled Media Synchronization.

Network I/O driver 1628 receives the related data streams from MSM 1608 and transmits data packets corresponding to those data streams to the network via network interface 1514. Network I/O driver 1628 is described in further detail later in this specification in conjunction with FIGS. 21, 22, and 23.

Operational Overview of the Server Software Architecture

The basic operations of the server software architecture are to initialize the server subsystem, start the server services, transmit data to the network (and/or write data to a file), stop the server services when the session is complete, and terminate the server subsystem.

Server subsystem initialization is implemented as follows:

The system operator asks the server application to initialize the server subsystem to transmit selected data streams on specified logical channels.

The server application passes the channel information (with the selected data streams for the multicast session) to the media services manager (MSM) (using the MSM_InitServices function).

The MSM asks the global dynamic loader (GDL) to load the appropriate media service providers (MSPs), as well as the network I/O drivers.

The GDL loads the specified MSPs and saves the procedure addresses for all real-time media services (RMS) API entry points, along with other MSP control information, into a unique structure for each MSP instance.

MSM opens the specified MSPs (using the OpenService function) and initializes the network and/or file services. When an MSP is opened, the MSP is initialized into a paused state. Using the OpenService function, the MSM passes to each MSP various initialization and configuration information instructing the MSP what to do and how to behave. The MSM also passes its entry-point proc addresses (i.e., the RMS API) to each MSP to enable the MSP to communicate with the MSM.

Starting or resuming (i.e., unpausing) a multicast session by the server is implemented as follows:

The system operator asks the server application to start processing specified data streams. In an alternative preferred embodiment, the server application starts the processing automatically as part of initialization and does not require a separate request from the system operator.

The server application passes the MSM a list of the data streams to be started (using the MSM_StartServices function).

The MSM tells each appropriate MSP to start transferring captured data to the MSM (using the StartService function).

Steady state server processing is implemented as follows:

Upon capturing new data, the MSP asks the MSM for an appropriate time stamp value for the MSP's new data packet (using the NewSyncStamp function). All MSP data packets are preferably time stamped even if they are not being synchronized with other data from other MSPs.

The MSP delivers the time-stamped data packet to the MSM (using the ReceiveData callback function).

If data is to be transmitted to the network, then the MSM sends a copy of the new data to the network I/O driver (using the WriteNet function).

If data is to be recorded locally, then the MSM sends a copy of the new data to the mass storage device driver (using the WriteFile function).

If local monitoring is selected, then the MSM sends a copy of the new data to the appropriate server sink MSP (using the WriteData function).

After receiving confirmations from the network and the mass storage device driver (via RecycleBuffer function calls) and from the sink MSP (via a WriteDataComplete function call) that the data have been processed, the MSM recycles the buffer to the appropriate source MSP (using the RecycleBuffer function). The source MSP is then free to refill the buffer with new data to repeat the process.

Stopping or pausing a multicast session by the server is implemented as follows:

The system operator asks the server application to stop processing specified data streams.

The server application passes the MSM the data streams to be stopped (using the MSM_StopServices function).

The MSM tells each appropriate MSP to stop service (using the StopService function).

Each MSP will generally stop sending data to the MSM once it is stopped (i.e., paused). However, an MSP may continue to send data, if, for example, the MSP needs to maintain the signal. Even if an MSP stops sending data to the MSM, the MSP may continue to capture data, depending upon the specific requirements of the MSP.

Server subsystem shutdown (i.e., termination) is implemented as follows:

The system operator asks the server application to terminate the multicast session.

The server application tells the MSM to terminate services (using the MSM_TerminateServices function).

The MSM closes each MSP instance (using the CloseService function).

Each MSP performs functions such as closing drivers or freeing buffers, as necessary.

After the MSPs are closed, the MSM shuts down the network stack and closes any other non-MSP services.

Client Subsystem

Figure 17:
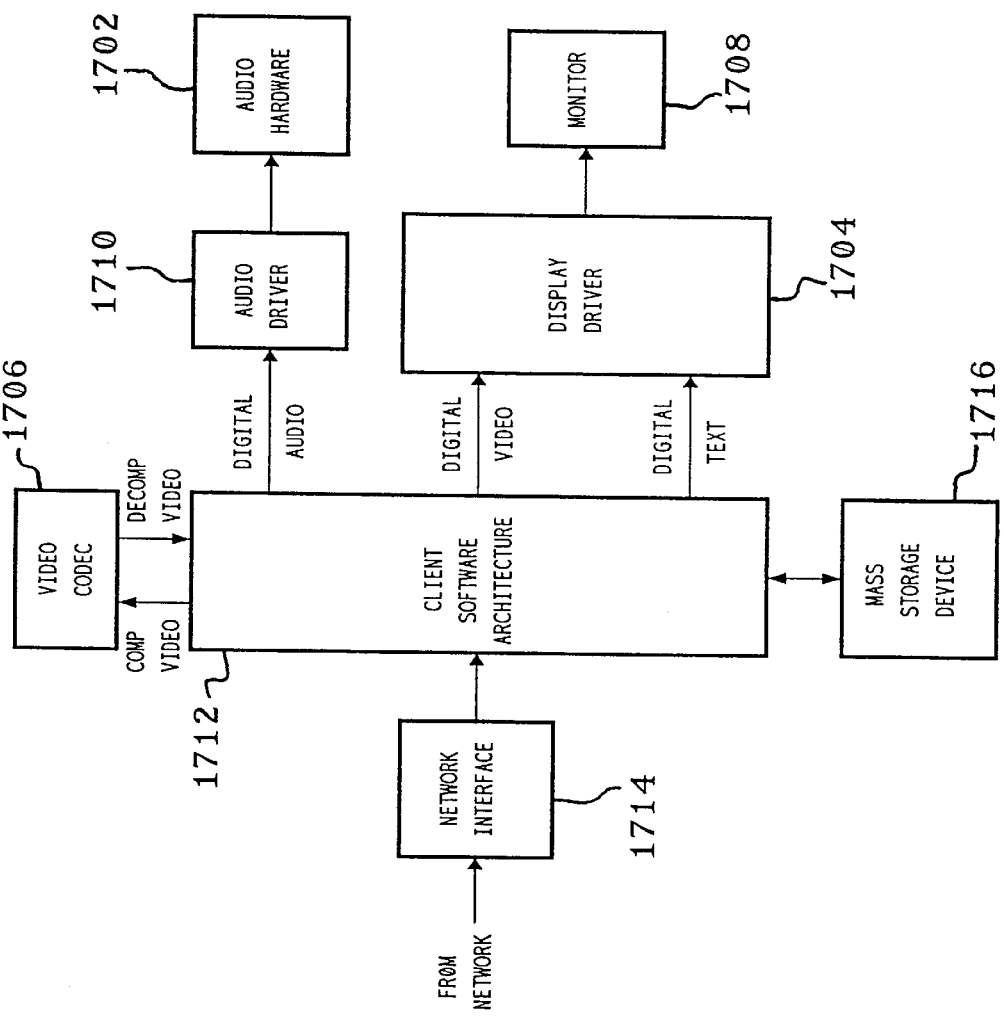
FIG. 17 is a block diagram of the client subsystem of the multicast system of FIG. 1.

Referring now to FIG. 17, there is shown a block diagram of client 104 of multicast subsystem 100 of FIG. 1, according to a preferred embodiment of the present invention. Client subsystem 104 receives from the network and then processes, the data packets corresponding to a selected channel. Server processing may include playing and/or recording the selected channel program.

Network interface 1714 of client subsystem 104 receives audio, video, and text network data packets from the network and transmits the data packets to client software architecture 1712. Client software architecture 1712 reconstructs the audio, video, and text data streams from the network data packets. Client software architecture 1712 transmits the audio data stream to audio driver 1710, which in turn processes and transmits the audio data to audio hardware 1702 for play. Client software architecture 1712 transmits the compressed video data stream to video codec 1706 for decompression and transmission back to client software architecture 1712. Client software architecture 1712 then transmits the decompressed video data stream as well as the text data stream to display driver 1704 for processing and display on monitor 1708.

Client 104 also supports the recording of data from the network to mass storage device 1716 with or without concurrent playing of the multicast data. In addition, server 102 supports the playing of recorded data previously stored in mass storage device 1716.

Network interface 1714 is any compatible device for interfacing with the network. For example, when the network is an Ethernet network, network interface 1714 may be an Intel® Ether Express 16 card with suitable software (e.g., Novell Link Support Layer under the Novell ODI). Client software architecture 1712 is implemented on any suitable computer such as a personal computer with an Intel® i486 microprocessor. Client software architecture 1712 is described in further detail later in this specification in conjunction with FIG. 18. Audio driver 1710 may be any suitable hardware/software device for processing audio data and is preferably a Microsoft Wave Driver. Audio hardware 1710 may be any suitable device for playing digital audio data. Display driver 1704 may be any suitable driver for displaying video and text data and is preferably Microsoft Video for Windows. Monitor 1708 may be any suitable device for displaying video and text.

Client Subsystem Software Architecture

Figure 18:
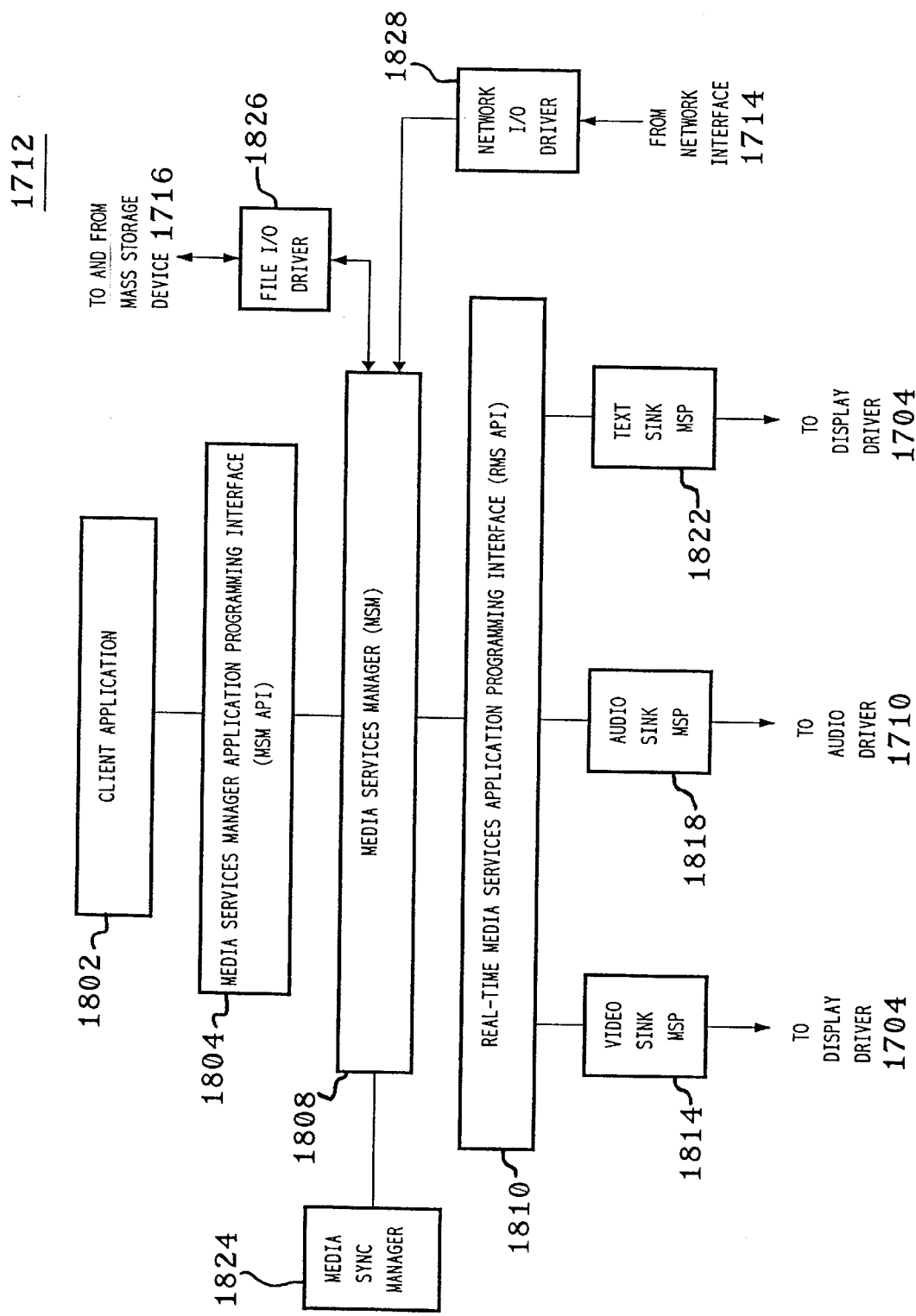
FIG. 18 is a block diagram of the software architecture of the client subsystem of FIG. 17.

Referring now to FIG. 18, there is shown a block diagram of client software architecture 1712 of client 104 of FIG. 17, according to a preferred embodiment of the present invention.

Client application 1802 of client software architecture 1712 allows an user of multicast system 100 to select a multicast channel to receive and process, where processing may include playing the data, recording the data, or both. That is, client application 1802 is used to select:

which data streams are to be processed and where to get the data streams (i.e., from the network or from mass storage device 1716. Client application 1802 asks media services manager (MSM) 1808 to collect data from a selected network channel and play it for the user as appropriate.

Client application 1802 asks the media services manager (MSM) 1808 to initialize and start a sink media service provider (MSP) for each selected data stream. The user uses the user interface of client application 1802 to configure the channels as described earlier in this specification in conjunction with FIGS. 2–14.

Network I/O driver 1828 receives network data packets from the network via network interface 1714 and transmits data streams corresponding to those data packets to media services manager (MSM) 1808. Network I/O driver 1828 is described in further detail later in this specification in conjunction with FIGS. 21, 22, and 23.

MSM 1808 manages the flow of data through client software architecture 1712 as specified by client application 1802. Data may flow through MSM 1808 over the following data paths:

From the network to a sink media service provider (MSP) (for playing multicast data), From the network to mass storage device 1716 (for recording of multicast data for subsequent processing), and From mass storage device 1716 to a sink MSP (for playing of locally recorded multicast data).

MSM 1808 recognizes the available sink MSPs and is responsible for initializing and configuring the MSPs for the defined channel. MSM 1808 has no knowledge about the actual type or format of the data flowing through MSM 1808. Client application 1802, MSM 1808, and the MSPs provide channel configuration capabilities both before and during channel play. MSM 1808 is designed to be modified to support new features without significant changes in the rest of client software architecture 1712.

Video sink MSP 1814 and text sink MSP 1822 receive a video data stream and a text data stream, respectively, from MSM 1808 and transmits the video and text data to display driver 1704 of FIG. 17 for display on monitor 1708. Similarly, audio sink MSP 1818 receives an audio data stream from MSM 1808 and transmits the audio data to audio driver 1710 for play on audio hardware 1702.

Client application 1802 communicates with MSM 1808 using application-level MSM application programming interface (API) 1804, which preferably supports the same function calls as MSM API 1604. MSM 1808 uses file I/O driver 1826 to store and retrieve data to and from mass storage device 1716. File I/O driver 1826 preferably supports the same function calls as file I/O driver 1626. MSM 1808 and a sink MSP communicate using RMS API 1810, which preferably supports the same function calls as RMS API 1610. MSM API 1604, file I/O driver 1626, and RMS API 1610 of server software architecture 1512 were described earlier in this specification in conjunction with FIG. 16.

Media sync manager 1824 determines whether the time stamp pulled from a data packet is "in sync" with the designated sync target data type. Designated sync target data are played as soon as they are received. Media sync manager 1824 keeps track of whether the sync target is running (i.e., whether there is data to which to sync) and, if so, media sync manager 1824 keeps track of the last time stamp of that data type. When a non-target MSP asks whether it is in sync with the sync target MSP, media sync manager 1824 responds by telling the non-target MSP to wait, play now, hurry (i.e., the packet is behind schedule), or that there is an error. The non-target MSP decides how to respond to these various messages. Media synchronization is described in further detail later in this specification in a section entitled Media Synchronization.

Operational Overview of the Client Software Architecture

The basic operations of the client software architecture are to initialize the client subsystem, start the client services, receive channel data from the network (or read data from a file), stop the client services when the session is complete, and terminate the client subsystem.

Client subsystem initialization is implemented as follows:

The user asks the client application to initialize the client subsystem with specified channels.

The client application passes the channel information to the media services manager (MSM) (using the MSM_InitServices function), also specifying which data streams to play and how to initialize them.

The MSM asks the global dynamic loader (GDL) to load the appropriate media service providers (MSPs), as well as the network I/O drivers.

The GDL loads the specified MSPs and saves the procedure addresses for all real-time media services (RMS) API entry points, along with other MSP control information, into a unique structure for each MSP instance.

MSM opens the specified MSPs (using the OpenService function) and initializes the network and/or file services. The OpenService function is used to instruct an MSP how to initialize and configure itself. OpenService also delivers RMS entry points into the MSM for the MSP to use.

Each client sink MSP posts its sink buffers to the MSM to be filled with data from the network or from a file. When an MSP is opened, the MSP is initialized into a paused state.

Starting or resuming (i.e., unpausing) a multicast session by the client is implemented as follows:

The user asks the client application to start processing specified data streams. In a preferred embodiment, when the client subsystem is initialized, the client application automatically starts data stream processing without requiring a separate request from the user.

The client application passes the MSM a list of the data streams to be started (using the MSM_StartServices function).

The MSM tells each appropriate MSP to start receiving and playing data (using the StartService function).

Steady state client processing is implemented as follows:

Upon receiving new data from the network, the MSM transmits the data to the appropriate MSP (using the WriteData function).

The MSP asks the media sync manager how the data should be handled (e.g., based on whether the data is in sync with the sync target).

The MSP processes the data according to the instructions from the media sync manager. Processing may include waiting before playing the data, playing the data right away, or dropping the data.

After completing the processing of the data, the MSP recycles the buffer back to the MSM (using the WriteDataComplete function) for use with new data.

The MSM then posts the buffer back to the network I/O driver to be filled with new data from the network to repeat the process.

Stopping or pausing a multicast session by the client is implemented as follows:

The user asks the client application to stop processing specified data streams.

The client application passes the MSM a list of the data streams to be stopped (using the MSM_StopServices function).

The MSM tells each appropriate MSP to stop service (using the StopService function).

Each MSP stops playing data. Note that incoming data will still be sent to the MSPs so that they can decide how to handle the data while in the paused state. For example, a video MSP may need to continue to decompress video frames to be able to resume (i.e., unpause) services in the future.

Client subsystem shutdown (i.e., termination) is implemented as follows:

The user asks the client application to terminate the multicast session.

The client application tells the MSM to terminate services (using the MSM_TerminateServices function).

The MSM closes each MSP instance (using the CloseService function).

Each MSP performs functions such as closing drivers or freeing buffers, as necessary.

After the MSPs are closed, the MSM shuts down the network stack and closes any other non-MSP services.

Buffer Management

Figure 19:
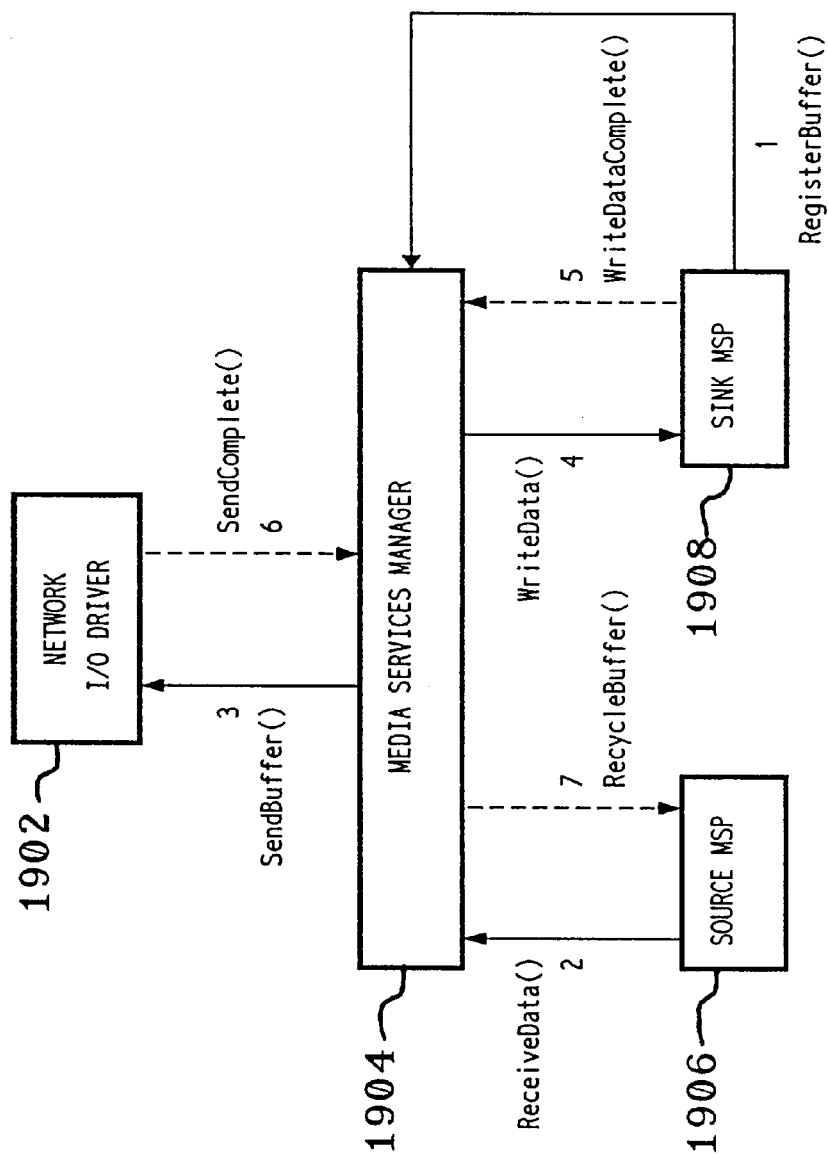
FIG. 19 is a representation of the flow of data through the server software architecture of FIG. 16.

Referring now to FIG. 19, there is shown a representation of the flow of data through server software architecture 1512 of FIG. 16, according to a preferred embodiment of the present invention. Data flow from a source MSP 1906 through the MSM 1904 to the network input/output (I/O) driver 1902. If the server is monitoring the data being multicast over the network, then data also flow from the MSM 1904 to a sink MSP 1908. The source and sink MSPs own (i.e., allocate and free) the data buffers, because only the MSPs know the size and format of the data. Neither the MSM or any of the media-independent services (e.g., the network I/O drivers) monitor or alter data buffers, although data may be appended for service processing as in the network I/O driver.

As represented in FIG. 19, the flow of data through server software architecture 1512 proceeds as follows:

1. If the server application selects monitoring of the data being multicast over the network, then sink MSP 1908 allocates and registers sink buffers with MSM 1904 (using the RMS API function RegisterBuffer). This occurs when sink MSP 1908 is opened and before any data has been captured by source MSP 1906.
2. Source MSP 1906 allocates source buffers, fills them with data (on some regular interval for real-time data), and tells MSM 1904 when there is new data for MSM 1904 to receive (using the RMS API function ReceiveData).
3. After MSM 1904 receives a source buffer, it sends the source buffer data to the network I/O driver 1902 for transmission over the network (using MSM API function SendBuffer).
4. If the appropriate sink MSP 1908 is open, MSM 1904 will copy the source buffer data into the next available sink buffer, and write the sink buffer to be played by sink MSP 1908 (using the RMS API function WriteData).
5. After sink MSP 1908 plays a sink buffer, sink MSP 1908 informs MSM 1904 that the sink buffer can be reused (using the RMS API function WriteDataComplete).
6. After the source buffer data has been transmitted over the network, network I/O driver 1902 informs MSM 1904 that the source buffer can be reused (using the MSM API function SendComplete).

7. After network I/O driver 1902 and sink MSP 1908 have released the source buffer back to MSM 1904, MSM 1904 returns the source buffer to source MSP 1906 for reuse (using the RMS API function RecycleBuffer).

Figure 20:
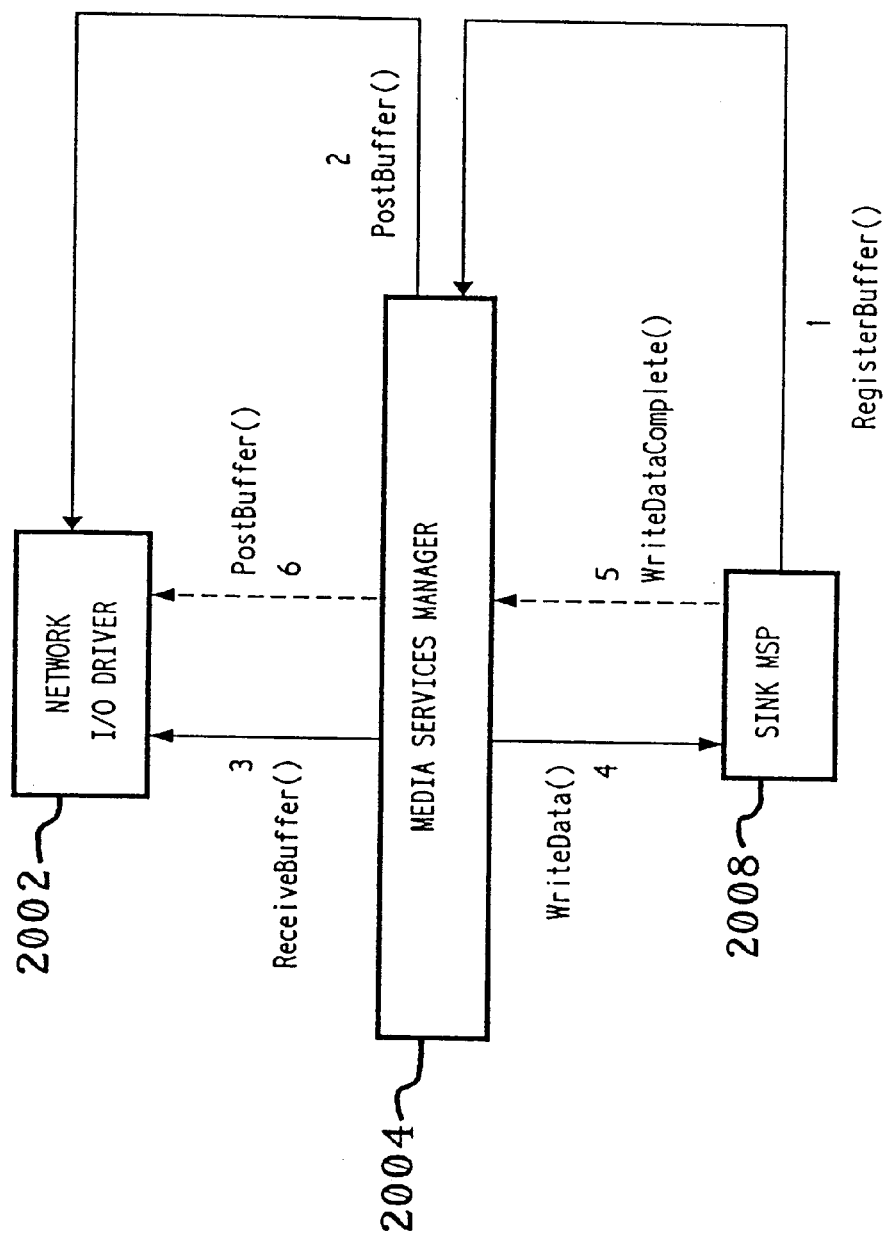
FIG. 20 is a representation of the flow of data through the client software architecture of FIG. 18.

Referring now to FIG. 20, there is shown a representation of the flow of data through client software architecture 1712 of FIG. 18, according to a preferred embodiment of the present invention. Data flow from the network input/output (I/O) driver 2002 through the MSM 2004 to a sink MSP 2008. The flow of data through client software architecture 1712 proceeds as follows:

1. Sink MSP 2008 allocates and registers sink buffers with MSM 2004 (using RegisterBuffer). This occurs when sink MSP 2008 is opened and before any data has been received from the network.
2. When MSM 2004 initializes network I/O driver 2002, the MSM specifies the data streams to be received (i.e., which sink MSPs are open). MSM 2004 then posts all of the appropriate sink buffers to the network (using the MSM API function PostBuffer).
3. When data is received by network I/O driver 2002 from the network, network I/O driver 2002 fills a sink buffer and passes it to MSM 2004 (using the MSM API function ReceiveBuffer).
4. MSM 2004 then writes the sink buffer data to the sink MSP that owns the buffer (using the WriteData function).
5. After sink MSP 2008 plays the sink buffer data, sink MSP 2008 informs MSM 2004 that the sink buffer can be reused (using the WriteDataComplete function).
6. After sink MSP 2008 informs MSM 2004 that the sink buffer data has been played, MSM 2004 re-posts the buffer to network I/O driver 2002 to be reused (using the PostBuffer function).

FIGS. 19 and 20 apply to writing data to a network and receiving data from a network, respectively. Those skilled in the art will understand that writing data to a file and reading data from a file are implemented using analogous processing.

Network Input/Output Driver

Figure 21:
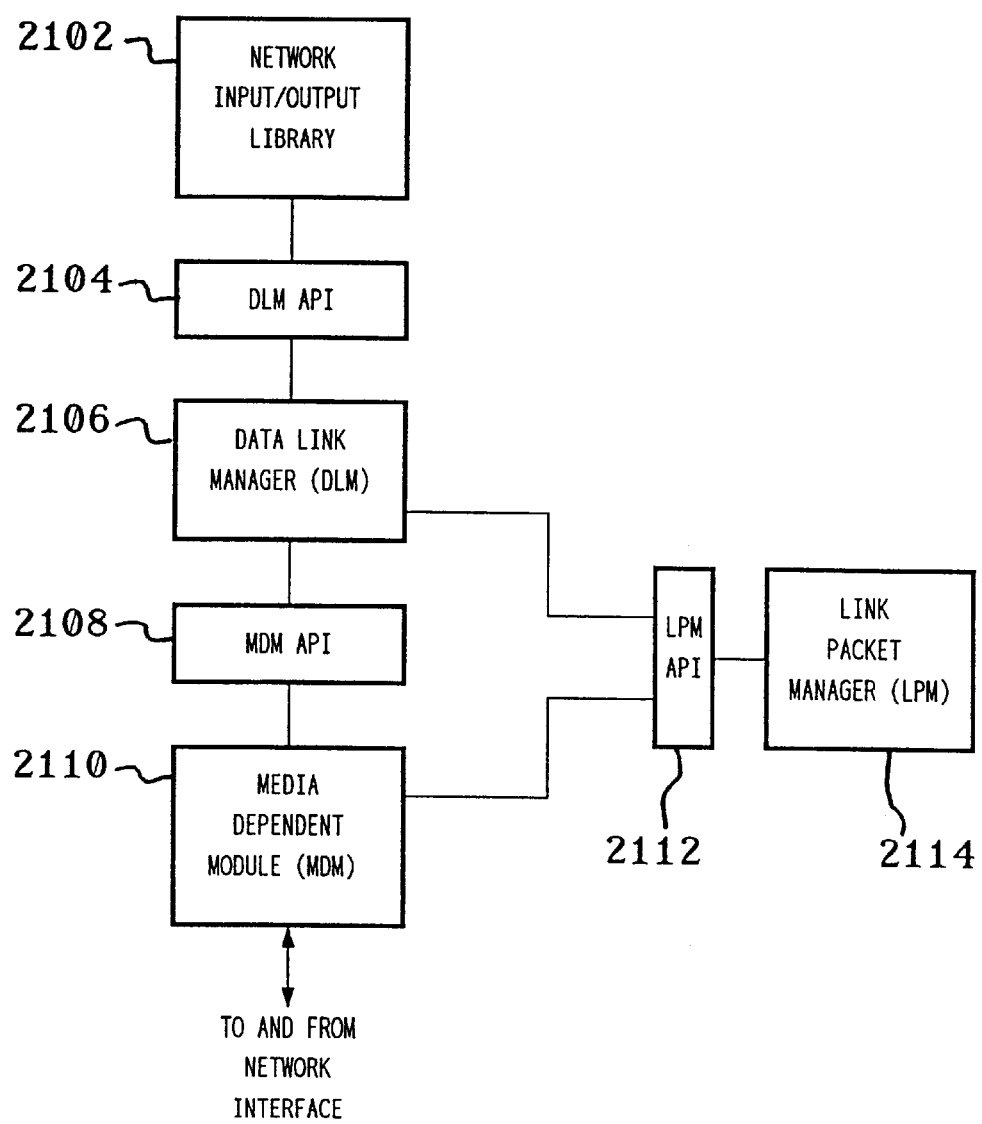
FIG. 21 is a block diagram of the software architecture of the network input/output (I/O) driver of the server software architecture of FIG. 16 and the client software architecture of FIG. 18.

Referring now to FIG. 21, there is shown a block diagram of the software architecture of network I/O driver 2100, according to a preferred embodiment of the present invention. In a preferred embodiment, network I/O driver 2100 comprises the functionality of both network I/O driver 1628 of server software architecture 1512 of FIG. 16 and network I/O driver 1828 of server software architecture 1712 of FIG. 18.

In a server, network I/O driver 2100 receives related, time-stamped data streams from the server media services manager and transmits data packets corresponding to those data streams to the network for multicasting. In a client, network I/O driver 2100 receives related, time-stamped data packets from the network and transmits data streams corresponding to those data packets to the client media services manager for display and/or recording of the multicast channel data.

Network I/O library 2102 of network I/O driver 2100 provides a high level network interface to the modules of multicast system 100. The MSM uses the following network I/O library functions to communicate with network I/O driver 2100:

InitNetOut( ): Called by the MSM to prepare for transmitting data packets on the network.

WriteNet( ): Transmits the specified data packet on the network using the appropriate socket ID.

RecycleBuffer( ): Called by network I/O module 2100 to give MSP buffers back to the MSM after the data have been transmitted on the network.

This function preferably resides in the MSM.

TerminateNetOut( ): Terminates the network output session.

InitNetIn( ): Called by the MSM to prepare for receiving data packets from the network.

NetPostBuffer( ): Called by the MSM to register an MSP buffer with the network for receiving new data. MSP buffers are loaded into different socket queues based upon data types.

WriteBuffer( ): Called by network I/O driver 2100 to inform the MSM that a new data packet has been received into one of the socket queues. This function preferably resides in the MSM. In response, the MSM delivers the new data packet to the appropriate MSP to be played.

TerminateNetIn( ): Terminates the network input session.

Data link manager (DLM) 2106 orchestrates the flow of one or more channels over one or more transport media (e.g., Ethernet network), where each channel comprises one or more types of data streams (i.e., audio, video, text). DLM 2106 provides fragmentation and re-assembly (i.e., de-fragmentation) of large data messages. Network I/O library 2102 and DLM 2106 communicate with one another using DLM application programming interface (API) 2104. DLM 2106 and DLM API 2104 are described in further detail later in this specification in conjunction with FIG. 22.

Media dependent module (MDM) 2110 provides all transport media specific functionality. There is one MDM 2110 for each transport medium/transport protocol pair (e.g., Ethernet network with Novell ODI-compliant driver running on an Intel Ether Express 16 network card). MDM 2110 provides functionality for address manipulation and data transfer. DLM 2106 and MDM 2110 communicate with one another using MDM API 2108. MDM 2110 and MDM API 2108 are described in further detail later in this specification in conjunction with FIG. 23.

Link packet manager (LPM) 2114 orchestrates the flow of link packets to and from data link manager (DLM) 2106 and media dependent module (MDM) 2110. Link packet manager (LPM) 2114 creates, destroys, and allocates link packets for network I/O driver 2100. A link packet is a data structure shared between DLM 2106 and MDM 2110. Link packets provide efficient transfer of data between DLM 2106 and MDM 2110. DLM 2106 and MDM 2110 communicate with LPM 2114, and vice versa, using LPM API 2112. The link packet structure is defined later in this specification in conjunction with FIGS. 28 and 29.

A global dynamic loader (GDL) (not shown) is responsible for bringing DLMs and MDMs into the system as needed and for discarding them when they are no longer needed. The GDL is described in further detail later in this specification in conjunction with FIGS. 31 and 32.

Data Link Manager

Figure 22:
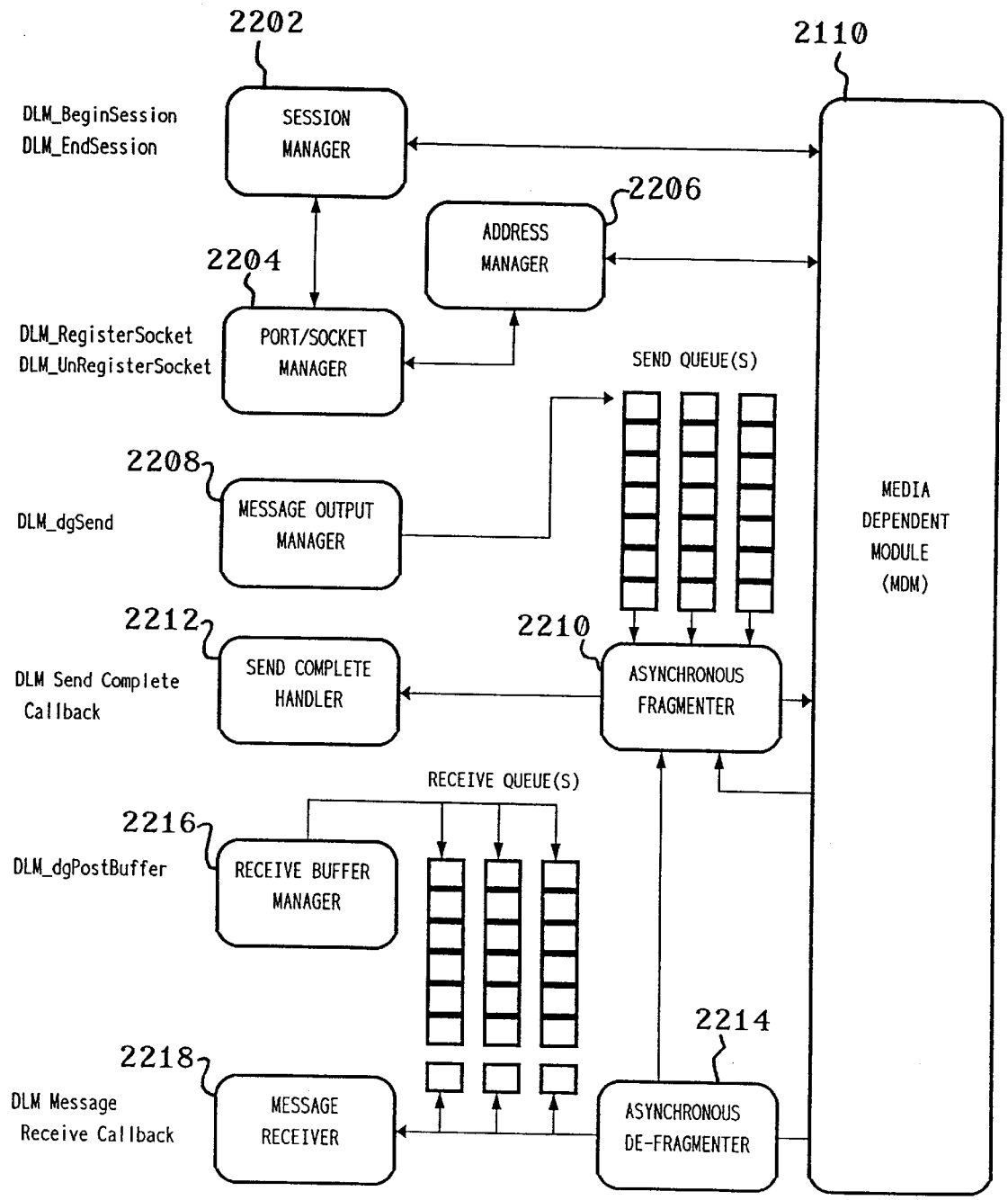
FIG. 22 is a block diagram of the data link manager of the network I/O driver of FIG. 21.

Referring now to FIG. 22, there is shown a block diagram of data link manager (DLM) 2106 of network I/O driver 2100 of FIG. 21, according to a preferred embodiment of the present invention. DLM 2106 is configured for only connectionless data transfers. DLM 2106 supports data transfers of up to 64K bytes per data message. The network may not be able to support data packets of up to 64K bytes. In that case, in the server, DLM 2106 fragments data messages as necessary for transmission on the network. In a client, DLM 2106 re-assembles (de-fragments) the network data packets received from the network into the original data messages. DLM 2106 preserves message boundaries (i.e., the data messages re-assembled by DLM 2106 in a client are the same as the data messages given to DLM 2106 in a server).

DLM 2106 also manages sockets. A socket is a logical combination of a network address and a port number. The network address is passed through DLM 2106 to MDM 2110 for processing. The ports on the network address are maintained by DLM 2106. In a server, DLM 2106 is responsible for multiplexing the ports onto the correct network addresses. This multiplexing of ports onto addresses is similar to the multiplexing of channels onto connections in a connection-oriented environment.

Data is sent from a server (i.e., source) socket to a client (i.e., destination) socket. Before the data is sent, the server source socket must be registered with the server DLM. The client socket is not registered with the server DLM. For packet reception at the client, the address and port of the client destination socket must be registered with the client DLM. The server socket is not registered with the client DLM. The client may receive data from any network node.

DLM 2106 is also responsible for maintaining a priority-based queue between all sockets on the same address. The priority-based queue allows packets from high priority sockets to be placed in an address queue ahead of packets from lower priority sockets. In a client, when a packet arrives on a particular address, DLM 2106 is responsible for determining the correct socket via the port number contained within the packet.

Session manager 2202 of DLM 2106 defines the network transport to use for data transfers using the functions DLM__BeginSession and DLM_EndSession to begin and end sessions, respectively. These functions and other functions and data structures identified in this section are described in further detail in this specification in the following sections.

Port/socket manager 2204 is responsible for maintaining user sockets. Port/socket manager 2204 uses the functions DLM_RegisterSocket and DLM_UnRegisterSocket to register and unregister sockets, respectively.

Address manager 2206 maintains the network addresses specified within the sockets. When the user requests a socket with a previously undefined network address, address manager 2206 opens the address with the MDM and adds it to its table of current addresses.

Message output manager 2208 maintains the queue of buffers waiting to be output to the network. A queue is maintained for each MDM address. The function call DLM_dgSend causes message output manager 2208 to place the received buffer into the queue in order of priority. The message output manager 2208 then instructs asynchronous fragmenter 2210 to output one or more fragments (i.e., data packets containing portions of the data message stored at the head of the buffer queue) to the network.

In a server, asynchronous fragmenter 2210 performs the actual transmission of data to the MDM. Fragmenter 2210 is called for every network event (i.e., transmission-completed event or packet-received event) or whenever a buffer is placed onto the queue. Fragmenter 2210 gets an empty link packet from link packet manager 2114, checks the flow control with the MDM, copies the next fragment from the buffer at the head of the queue into the link packet for the address that triggered the event, and transmits the filled, addressed packet to the MDM. When the buffer at the head of the queue has been completely fragmented and transmitted to the MDM, fragmenter 2210 instructs send complete handler 2212 to call the DLM Send Complete Callback function to inform network I/O library 2102 that DLM processing of the buffer is complete.

In a client asynchronous de-fragmenter 2214 re-assembles (i.e., de-fragments) the data packets received from the network. When a data packet arrives, the MDM calls de-fragmenter 2214 which checks the queue of receive buffers for the correct address. At the head of the queue, there is a distinguished element that is currently being built. De-fragmenter 2214 verifies that the incoming data packet should be placed at the next expected offset within the buffer under construction and, if so, copies the data into the buffer. If the receive buffer is complete, de-fragmenter 2214 instructs message receiver 2218 to transmit the completed buffer to network I/O library 2102 using the DLM Message Receive Callback function.

If there is no receive buffer currently under construction and if the received data packet should begin a new buffer, then de-fragmenter 2214 removes receive buffers from the head of the queue until a buffer is found that is large enough to contain the entire arriving data message. Receive buffers that are too small are returned to network I/O library 2102 using E_TOOSMALL error code of the DLM Message Receive Callback function call. If the queue empties before a receive buffer of sufficient size is found, then de-fragmenter 2214 drops the received packet and enters the dropping state. Data will be dropped for this socket until a packet that begins a new data message arrives on the same address.

Receive buffer manager 2216 maintains the queues of receive buffers that the user has posted using the DLM_dgPostBuffer function call. One receive queue is maintained for each socket being serviced.

To establish a connectionless data transfer session, the server and a client each call the DLM_BeginSession and DLM_RegisterSocket functions to their respective local DLMs. The local DLM responds by calling the DLM Session Callback function with the REGISTER_COMPLETE event to notify the server/client that the socket has been successfully registered. The server sends data over the network by calling the DLM_dgSend function to the server DLM. Upon receipt of the data, the client DLM notifies the client of receipt of the data by calling the DLM Message Receive Callback function specified for this socket.

To close a socket, the server calls the DLM_UnRegisterSocket function to which the server DLM responds by calling the DLM Session Callback function with the UNREGISTER_COMPLETE event. The server then calls the DLM_EndSession function to which the server DLM responds by calling the DLM Session Callback function with the SESS_CLOSED event. The client and client DLM implement an identical sequence of function calls.

The following sections provide further information regarding the data structures and functions for interfacing a DLM with a connectionless network.

Data Structures of the Data Link Manager

This section describes the data structures that the DLM presents externally.

Session information is contained in a DLM session ID word, a 32-bit unsigned integer with bits as defined below:

| 31 | 28 | 27 | 22 | 21 | 16 | 15 | 8 | 7 | 0 |
|---|---|---|---|---|---|---|---|---|---|
| ID Type | | Reserved | | Session Index | | DLM ID | | Reserved | |

Bits 0–7 of the session ID are reserved and are not used by the DLM. Bits 8–15 represent the DLM ID, given in DLM_BeginSession (described below). Bits 16–21 represent the session index. The session index preferably begins at 0 for the first session and is incremented for each additional session opened on the DLM. There are a maximum 64 sessions on any one DLM. Bits 22–27 are also reserved. Bits 28–31 represent the identifier type.

Socket information is contained in a DLM socket ID word, a 32-bit unsigned integer with bits defined as follows:

| 31 | 28 | 27 | 23 | 22 | 18 | 17 | 12 | 11 | 6 | 5 | 0 |
|---|---|---|---|---|---|---|---|---|---|---|---|
| ID Type | | Port ID | | Address Index | | Session Index | | DLM ID | | Reserved | |

Bits 0–5 of the socket ID are reserved and are not used by the DLM. Bits 6–11 represent the DLM ID, given in DLM_BeginSession (described below). Bits 12–17 represent the session index for the session on which this socket is defined. Bits 18–22 represent the internal address index of the network address. The internal address index preferably begins at 0 for the first address and is incremented for each additional address. Bits 23–27 represent the port identifier of the socket. Bits 28–31 represent the identifier type.

The DLM characteristics structure DLMCHARS contains relevant data about the following limitations and parameters of a given DLM:

| | |
|---|---|
| DlmId | ID given to this DLM on DLM_BeginSession. |
| MaxSessions | Maximum number of sessions that the DLM can support. |
| MaxConnections | Maximum number of simultaneous connections that the DLM can support. For a DLM that supports only connectionless data transfers, this value is preferably 0. |
| MaxChannels | Maximum number of simultaneous channels that the DLM can support on any given connection. For a DLM that supports only connectionless data transfers, this value is preferably 0. |
| MaxAddresses | Maximum number of simultaneous, different network addresses that the DLM can support. |
| MaxPorts | Maximum number of simultaneous ports that the DLM can support on any given network address. |
| MaxSockets | Maximum number of simultaneous sockets that the DLM can support. |

When a socket is opened via DLM_RegisterSocket, the following requested characteristics of the network services to be provided are specified using the address characteristics structure ADDRCHAR:

| | |
|---|---|
| BitRate | Network services must support at least this bit rate for the operation to be useful. |
| Priority | Requested priority of the socket. This may range from 0 to MAX_PRIORITY, where 0 is the lowest priority and MAX_PRIORITY is the highest. |

For connectionless data transfers, a socket specifies source and destination points for data. A socket consists of both a network address and a port.

A DLM_dgEvent structure is used in session callbacks to indicate that an event has taken place on the network. The following events are preferably supported:

| | |
|---|---|
| SESS_CLOSED | Network session is closed. |
| REGISTER_COMPLETE | Network socket registration is complete. |
| UNREGISTER_COMPLETE | Network socket bas been de-registered. |
| DG_ERROR | An error event has occurred. |

DLM Interface Functions for Connectionless Networks

Before data transfer begins, the DLM is initialized and the network access is established. This section describes the functions for setting up network access in multicast system 100. The following functions support setup/teardown and data transport at the DLM layer:

| | |
|---|---|
| DLM_BeginSession | Begins a network session. |
| DLM_RegisterSocket | Registers a network address with the network. |
| DLM_dgSend | Queues a buffer for sending data over the network. |
| DLM_dgPostBuffer | Makes a buffer available for receiving data over the network. |
| DLM_Pause | Pauses a network session. |
| DLM_UnPause | Unpauses a network session. |
| DLM_UnRegisterSocket | Unregisters a previously registered network socket. |
| DLM_EndSession | Closes a network session. |

Several of the functions of the DLM complete a synchronously. These functions generate callbacks to the user at a later time. The following callback function types are used by the DLM to notify the user of asynchronous events:

| | |
|---|---|
| DLM Session Callback | Called upon the completion of an asynchronous DLM event on this session (e.g., REGISTER_COMPLETE). |
| DLM Send Complete Callback | Called upon the completion of a send on this socket. |
| DLM Message Receive Callback | Called upon receiving data on this socket. |

The DLM Session Callback function notifies the user that a network socket has been registered or unregistered. The DLM Send Complete Callback function is activated whenever data has been extracted from a user's buffer and enqueued for transmission. It is not a guarantee that the data has actually been delivered to a client. The entry point for the DLM Send Complete Callback function is the specified SendCallback parameter to the DLM_RegisterSocket function. The DLM Message Receive Callback function is activated when data has arrived on the network for a particular socket.

The DLM_BeginSession function prepares the DLM for subsequent network access. DLM_BeginSession has no local callbacks and no peer callbacks.

The DLM_EndSession function ends the specified session. Any data arriving at an outstanding socket is ignored. All outstanding buffers are returned to the user via the Message Receive Callback function with the status set to indicate that the socket closed while the buffer was outstanding. All outstanding network sockets on this session are implicitly unregistered by this function.

The DLM_RegisterSocket function is called to open a communication socket as requested by the user. The user can request that a specific address and port ID be opened as a socket or that the DLM should select an address and port ID. The user can either request an address with a specific value or have one assigned. The address is then registered and a handle returned to the user in the callback data (i.e., the DLM address ID). The address handle is used in all other calls when a reference to the network address is required. A synchronous return from this function call with a good status indicates that the request for a new address has been successfully submitted. It does not indicate that the address can be used. The session callback with the REGISTER_

COMPLETE event type signals the completion of the registration process.

The DLM_dgSend function is called by the user to send buffers of data over the communication network. A synchronous return from this function with a good status indicates that the buffer was accepted for transmission and will be enqueued in the future. A synchronous return with a bad status indicates that the buffer will not be queued up and that the callback function will not be activated. The callback SendComplete from this function guarantees that the buffer has been posted to the network queue. There is no guarantee that the buffer was actually sent. The send complete callback function SendComplete is called when the buffer is posted to the network.

The DLM_dgPostBuffer function is called to make empty buffers available to the DLM in which incoming data may be placed. A synchronous return from this function with a good status indicates that a buffer has been posted to the network to receive data. A synchronous return with a bad status indicates that the buffer was never posted and that the callback function will not be activated. The data received callback ReceiveComplete from the DLM indicates that a new buffer that arrived over the network is now available. The receive complete callback function ReceiveComplete is called when DLM has filled the buffer with data from the network.

The DLM_UnRegisterSocket function deletes the socket from the DLM. DLM_UnRegisterSocket may make a local callback to UNREGISTER_COMPLETE.

The DLM_Pause function stops network operations at the DLM level. Until the user calls DLM_UnPause, all incoming data will be lost and all calls to DLM_dgSend will return a paused status. Buffers may still be posted to the network with DLM_dgPostBuffer, but they will not be filled with data and returned to the user until after the call to DLM_UnPause. Multiple calls to DLM_Pause have no effect.

The DLM_UnPause function resumes network operations at the DLM level. After this call, data will be sent and received normally. Multiple calls to DLM_UnPause, as well as calls without a previous call to DLM_Pause, have no effect.

Media Dependent Module

Figure 23:
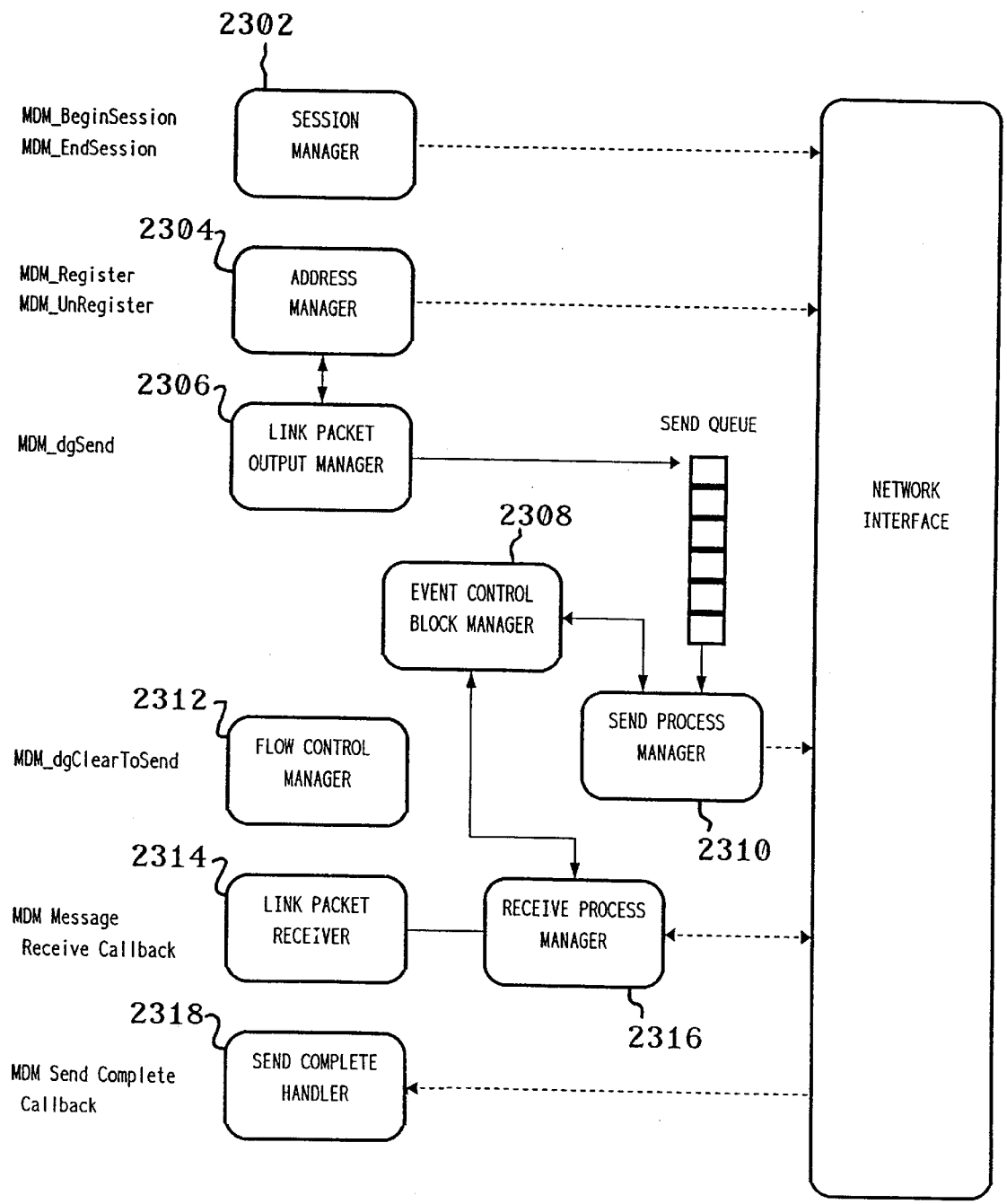
FIG. 23 is a block diagram of the media dependent module of the network I/O driver of FIG. 21.

Referring now to FIG. 23, there is shown a block diagram of media dependent module (MDM) 2110 of network I/O driver 2100 of FIG. 21, according to a preferred embodiment of the present invention. MDM 2110 hides the network specifics from DLM 2106 and other higher layers of network I/O driver 2100. MDM 2110 is the only module of network I/O driver 2100 that is affected by a change in the physical network. MDM 2110 conforms to a single API, independent of the physical medium in use. If a network implementation does not support a particular MDM function, MDM 2110 returns an error specifying that the requested function is not available. In FIG. 23, all dotted lines indicate function calls through the Microsoft Windows DPMI host to the network interface (preferably a Novell LSL and a Novell ODI-compliant driver). MDM 2110 recognizes network addresses for data transport, but has no knowledge of the defined ports/sockets.

Session manager 2302 of MDM 2110 has two external entry points: the MDM_BeginSession function call and the MDM_EndSession function call. Session manager 2302 is responsible for installing and removing the MDM as an ODI protocol stack. MDM 2110 allows only one active session. When a session is opened, if there is no active session, MDM 2110 locates the network interface and registers itself as a protocol stack. This operation is defined in Novell documentation entitled "Open Data-Link Interface Developer's Guide for DOS Workstation Protocol Stacks."

The protocol ID to service is extracted from the local address parameter of the MDM_BeginSession function call. If a session is already active and the user calls the MDM_BeginSession function, the parameters are checked to determine if they match the currently active session. If the parameters match, then the reference count on the session is incremented and MDM 2110 returns the session ID of the currently active session. If the parameters do not match, an error is returned. To end a session, the user calls the MDM_EndSession function. If there are open addresses on the current session, an error is returned. Otherwise, the reference count on the current session is decremented. If the reference count reaches zero, then MDM 2110 removes itself as a protocol stack.

Address manager 2304 is responsible for maintaining a list of the currently active network addresses and for verifying the validity of any given address. When a new address is given to MDM 2110 via the MDM_Register function call, the new address is entered into the list of active addresses. If the new address is a multicast address, then MDM 2110 notifies the network interface of the new multicast address via a function call to the network interface. When the user calls the MDM_UnRegister function, the given address is removed from the list of currently active addresses.

In a server, link packet output manager 2306 orchestrates the transmission of data packets from DLM 2106 to the network. Link packet output manager 2306 receives a link packet from DLM 2106 via the MDM_dgSend function call. Link packet output manager 2306 verifies the address and, if verified, places the packet into the send queue for subsequent transmission to the network.

In a server, send process manager 2310 transmits packets from the send queue to the network. Send process manager 2310 is governed by a timer. Each time the timer interrupts the send process, send process manager 2310 gets an event control block (ECB) from ECB manager 2308. Send process manager 2310 then removes a link packet from the head of the send queue and copies the data from the link packet into an ECB fragment. A copy is implemented for the ECB fragment to reside in low DOS memory for communication with the network interface. When the transmission of the link packet to the network is complete, the network interface instructs send complete handler 2318 to identify which link packet was completed and to notify the user via the MDM Send Complete Callback function specified in the MDM_Register call. Send complete handler 2318 then frees the indicated ECB.

In a client, receive process manager 2316 orchestrates the reception of data packets from the network. The network interface informs receive process manager 2316 that data is available. Receive process manager 2316 gets an event control block (ECB) from ECB manager 2308 and passes the ECB to the network interface for data reception. When the network interface has filled the ECB with data, the network interface passes the filled ECB back to receive process manager 2316. Receive process manager 2316 copies the network data from the ECB into a link packet, frees the network ECB, and instructs link packet receiver 2314 to pass the link packet to the user via the MDM Message Receive Callback function specified in the MDM_Register call.

Flow control manager 2312 ensures that the upper layers do not overfill MDM 2110 with data. The upper layers calls the MDM_dgClearToSend function, before sending a packet. Flow control manager 2312 checks the number of outstanding ECBs and the size of the send queue.

The following sections provide further information regarding the data structures and functions for interfacing an MDM with a connectionless network.

Data Structures of the Media Dependent Module

This section describes the data structures that the MDM presents externally.

Session information is contained in an MDM session ID word, a 32-bit unsigned integer with bits as defined below:

```
31      28 27        22 21       16 15         8 7          0
┌─────────┬──────────┬────────────┬─────────────┬────────────┐
│   ID    │ Reserved │  Session   │   DLM ID    │   MDM ID   │
│  Type   │          │   Index    │             │            │
└─────────┴──────────┴────────────┴─────────────┴────────────┘
```

Bits 0–7 contain the MDM ID, given in MDM_BeginSession. Bits 8–15 represent the DLM ID, also given in MDM_BeginSession. Bits 16–21 represent the session index. The session index preferably begins at 0 for the first session and is incremented for each additional session opened on the MDM. There are a maximum 64 sessions on any one MDM. Bits 22–27 are reserved. Bits 28–31 represent the identifier type.

Address information is contained in an MDM address ID word, a 32-bit unsigned integer with bits as defined below:

```
31      28 27      22 21       16 15         8 7          0
┌─────────┬──────────┬────────────┬─────────────┬────────────┐
│   ID    │ Address  │  Session   │   DLM ID    │   MDM ID   │
│  Type   │  Index   │   Index    │             │            │
└─────────┴──────────┴────────────┴─────────────┴────────────┘
```

Bits 0–7 contain the MDM ID, given in MDM_BeginSession Bits 8–15 represent the DLM ID, also given in MDM_BeginSession. Bits 16–21 represent the session index for the session on which this network address is defined. Bits 22–27 represent the address index of the network address. The address index preferably begins at 0 for the first address and is incremented for each additional address. There are a maximum of 64 open addresses on any one MDM. Bits 28–31 represent the identifier type.

Since a DLM is able to operate with one or more MDMs, the DLM is preferably able to adapt to the characteristics of a particular MDM. The MDM characteristics structure MDMCHARS is used by MDM_Get characteristics to report the following relevant data about the MDM:

| | |
|---|---|
| MdmId | MDM identifier used to refer to this MDM. |
| PacketSize | Most efficient packet size for transmission on the network. |
| MaxSessions | Maximum number of simultaneous sessions that the MDM can support. |
| MaxConnections | Maximum number of simultaneous connections that the MDM can support. Preferably 0 for connectionless data transfers. |
| MaxAddresses | Maximum number of simultaneous network addresses that the MDM can support. |

When a network address is opened via MDM_Register, the minimum bit rate of the network services to be provided is specified using the address characteristics structure ADDRCHAR.

A TADDR structure is used to represent a network address. For the Novell ODI implementation of connectionless data transfers, the first six bytes of the address field of the TADDR structure represent the value of the network address.

An MDM_dgEvent structure is used in the callback to indicate that an event has taken place on the network. This structure is used for all event callbacks except for the data send and data receive callbacks. The following events use the datagram specific event structure MDM_dgEvent:

| | |
|---|---|
| SESS_CLOSED | Network session is closed. |

| | |
|---|---|
| REGISTER_COMPLETE | Address registration is complete. |
| UNREGISTER_COMPLETE | Address has been de-registered. |
| DG_ERROR | An error event has occurred. |

MDM Interface Functions for Connectionless Networks

As with the data link manager (DLM), the media dependent module (MDM) is initialized and the network access is established before data transfers begin. The following are the MDM functions related to connectionless data transfer:

| | |
|---|---|
| MDM_BeginSession | Begins a network session. |
| MDM_Register | Opens and registers a network address. |
| MDM_dgSend | Queues a buffer for sending data over the network. |
| MDM_UnRegister | Unregisters a previously registered address. |
| MDM_dgClearToSend | Allows the user of MDM (e.g., a DLM) to perform flow control by verifying that the lower level network queue is not choked. |
| MDM_Pause | Pauses a network session. |
| MDM_UnPause | Unpauses a network session. |
| MDM_EndSession | Closes a network session. |

Certain MDM functions complete asynchronously. These functions begin an action and the user is called back when that action completes. The following callback functions are used by the MDM layer to communicate with the calling DLM:

| | |
|---|---|
| MDM Session Callback | Called upon the completion of an asynchronous MDM event on this session, e.g., REGISTER_COMPLETE. |
| MDM Send Complete Callback | Called upon the completion of a send on a given network address. |
| MDM Message Receive Callback | Called upon receiving data on this network address. |

The MDM Session Callback function notifies the user that a network address has been registered or unregistered.

The MDM Send Complete Callback function is activated whenever data has been extracted from a link packet and enqueued for transmission. There is no guarantee on the delivery of data on the network. The entry point for the MDM Send Complete Callback function is defined in the SendCallback parameter to the MDM_Register function.

The MDM Message Receive Callback function is activated when data has arrived on the network and has been copied into a link packet for the DLM. At the completion of the callback, the MDM assumes that it can free the link packet back to the link packet pool. The DLM copies any data that it intends to use after the callback. The entry point for the MDM Message Receive Callback function is defined in the ReceiveCallback parameter to MDM_Register function.

The MDM_BeginSession function prepares MDM for subsequent network usage before connectionless operations begin. Bytes 6–11 of the address field of the local address parameter for the MDM_BeginSession function contain the protocol ID to use. Session IDs are unique across all MDMs. MDM_BeginSession returns synchronously and has no local or peer callbacks.

The MDM_EndSession function ends the specified session. MDM_EndSession makes no peer callbacks, but may make a local SESS_CLOSED callback.

The MDM_Register function is called by a DLM to open an address at the MDM level. If the address has not been previously registered, the MDM opens the network address to allow data sends and receives. The MDM then returns a new MDM address ID to be used on all sends and receives for this address. If the address has been previously registered, the MDM will return the previously allocated MDM address ID. It is up to the DLM to correctly respond to the user.

A synchronous return from this function call with a good status indicates that the request for a new address has been successfully submitted. It does not indicate that the address is ready for use. The event callback with the REGISTER_COMPLETE event type signals the completion of the registration process.

The status of the REGISTER_COMPLETE callback specifies whether the address has been previously registered. If the Status field in the MDM_dgEvent structure is good, then the address has not previously been seen. If the Status field in the MDM_dgEvent structure indicates that the address has been previously registered, then the address ID returned is the same value as the address returned previously. MDM_Register may make a local REGISTER_COMPLETE callback.

The function MDM_dgClearToSend verifies that a link packet of the given size can currently be sent on the network on the specified MDM address. The DLM uses this function to perform flow control. MDM_dgClearToSend returns one of the following status indication values:

| | |
|---|---|
| TRUE | Data can currently be sent. |
| FALSE | Sending the indicated data is not currently possible. |

MDM_dgClearToSend makes no local or peer callbacks.

The MDM_dgSend function is called by the DLM to send link packets over the communication network. The DLM is responsible for ensuring flow control by calling MDM_dgClearToSend prior to this call. A synchronous return from this function with a good status indicates that the link packet was accepted for transmission and will be enqueued in future. A synchronous return with a bad status indicates that the link packet will not be queued up and the callback function will not be activated.

The callback from this function guarantees that the link packet has been posted to the network queue. There is no guarantee that the link packet was actually sent. The MDM will transmit the packet on the network address corresponding to the given MDM address ID. In order for the link packet to arrive at the correct network address, and be handled by the receiving DLM, the caller of MDM_dgSend (e.g., the server DLM) must initialize the header fields of the link packet with both the server (i.e., source) and client (i.e., destination) sockets. The Send Complete callback function is called when the link packet is posted to the network.

The MDM_UnRegister function disables the address for sending or receiving data, and frees up any resources associated with the address. MDM_UnRegister may make a local UNREGISTER_COMPLETE callback.

The MDM_Pause function stops network send operations at the MDM level. Until the user calls MDM_UnPause, all incoming data will be lost. Calls to MDM_dgSend are still allowed and will operate normally in order to drain send queues of other network layers. Multiple calls to MDM_Pause have no effect.

The MDM_UnPause function resumes network operations at the MDM level. After this call, data will be received normally. Multiple calls to MDM_UnPause, as well as calls without a previous call to MDM_Pause, have no effect.

Data Packet Formats

Figure 24:
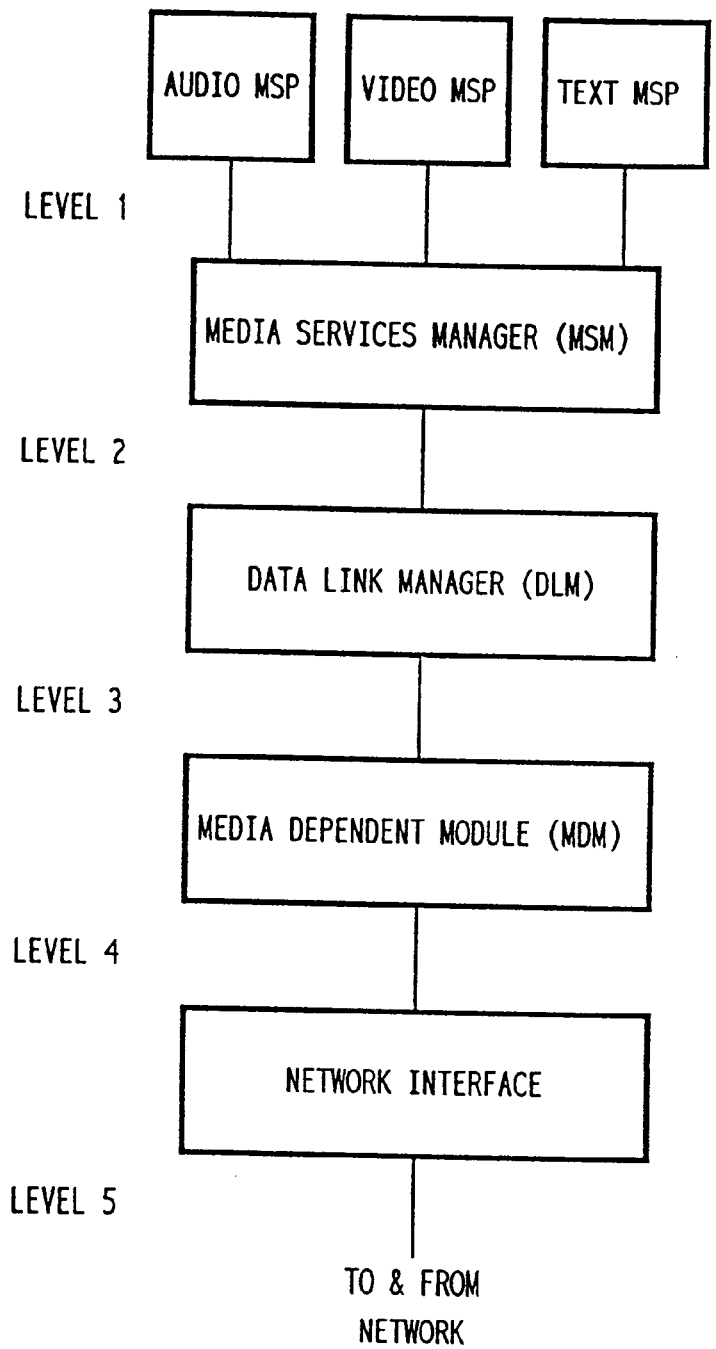
FIG. 24 is a representation of the data flow through each server and client of the multicast system of FIG. 1.

Referring now to FIG. 24, there is shown a representation of data flow through each server and client of multicast system 100 of FIG. 1, according to a preferred embodiment of the present invention. Data is transmitted between a media service provider (MSP) and the media services manager (MSM) in data packets that conform to the appropriate Level 1 format. Similarly, data transmitted between the MSM and the data link manager (DLM) conforms to the Level 2 data packet format; data transmitted between the DLM and a media dependent module (MDM) conforms to the Level 3 data packet format; data transmitted between an MDM and the appropriate network interface conforms to the Level 4 data packet format; and data transmitted by the network interface to the network and received by the network interface from the network conforms to the Level 5 data packet format.

At a server, audio, video, and text MSPs receive audio, video, and text data streams from the appropriate media capture subsystems and transmit Level 1 data packets (i.e., data messages) to the MSM. The MSM generates and transmits Level 2 data packets to the DLM, which in turn generates and transmits Level 3 data packets to the appropriate MDM. The MDM generates and transmits Level 4 data packets to the network interface, which in turn generates and transmits Level 5 data packets over the network to the clients.

At a client, the process is reversed. The network interface receives Level 5 data packets from the network and generates and transmits Level 4 data packets to the MDM. The MDM generates and transmits Level 3 data packets to the DLM, which in turn generates and transmits Level 2 data packets to the MSM. The MSM generates and transmits Level 1 data packets to the appropriate MSPs, which reconstruct the data streams for play in the appropriate media playback subsystems.

There are three different Level 1 data packet (i.e., data message) formats corresponding to the three different media types (audio, video, and text) handled by the MSPs of multicast system 100. Each Level 1 data packet contains media-specific header information and media-specific raw information.

Referring now to FIG. 25, there is shown a representation of a Level 1 audio data packet. A Level 1 audio data packet comprises a two-byte time stamp followed by 2048 bytes of audio data. The time stamp is attached to each Level 1 packet as it is captured in the server. The client uses the time stamp to update the synchronization clock when playing the data. Audio data is preferably captured continuously in 2048-byte messages conforming to the Microsoft Wave audio format defined in the Microsoft Multimedia Programmer's Reference.

Referring now to FIG. 26, there is shown a representation of a Level 1 video data packet. A Level 1 video data packet comprises a standard 28-byte Microsoft Video for Windows header, a four-byte reserved value, and up to 18 kilobytes of data. The data area size limit of 18 kilobytes is based on video data rates that are themselves governed by the video processing algorithm implemented in multicast system 100 of FIG. 1. Those skilled in the art will understand that alternative preferred embodiments of the present invention that implement other video processing algorithms may support higher data rates and therefore greater data area sizes in Level 1 video data packets.

Referring now to FIG. 27, there is shown a representation of a Level 1 text data packet. A Level 1 text data packet comprises up to 200 bytes of text data followed by a specified string termination character (e.g., the NULL character).

The MSM preferably does not interpret or modify the data packets that it receives. In the server, the MSM forwards Level 1 data packets to the DLM. In the client, the MSM forwards Level 2 data packets to the appropriate MSPs. As such, Level 1 and Level 2 data packets are preferably identical.

Referring now to FIG. 28, there is shown a representation of a Level 3 data packet (i.e., link packet) comprising a 24-byte DLM header and up to 1476 bytes of data. In the server, the DLM is capable of receiving Level 2 data packets of up to 65,536 bytes (64K bytes) in size. Without interpreting the Level 2 data, the DLM fragments the Level 2 data packets into data segments of up to 1476 bytes. To each data segment, the DLM adds a 24-byte DLM header to generate the Level 3 data packet or link packet.

Thus, for example, the server DLM may receive a 2050-byte Level 2 audio data packet (see FIG. 25) and generate two Level 3 data packets: one 1500-byte Level 3 packet (comprising a 24-byte DLM header followed by the first 1476 bytes of the Level 2 audio packet) and one 598-byte Level 3 packet (comprising a 24-byte DLM header followed by the last 574 bytes of the Level 2 audio packet). Similarly, the server DLM may receive a 201-byte Level 2 text data packet (see FIG. 27) and generate one 225-byte Level 3 data packet (comprising a 24-byte DLM header followed by the 201 bytes of the Level 2 text packet).

Referring now to FIG. 29, there is shown a representation of the 24-byte DLM header of a Level 3 data packet. The DLM header is defined as follows:

Destination Address Network address (a 6-byte unsigned integer) of the destination for the packet.

| | |
|---|---|
| Destination Port | Port number (a 1-byte unsigned integer) of the destination for the packet. |
| Source Address | Network address (a 6-byte unsigned integer) of the source of the packet. |
| Source Port | Port number (a 1-byte unsigned integer) of the source of the packet. |
| Message Number | DLM sequence number (a 4-byte unsigned integer) of the message on the given source socket. DLM uses this field to reconstruct messages from connectionless datagram link packets. |
| Offset | Offset in the message of the first byte of the link packet. The source socket, message number, and offset uniquely determine the location of the bytes of this link packet in the message. This allows the DLM to reconstruct messages on a per-socket basis. Offset is a 2-byte unsigned integer. |
| Size | Number of bytes in the data part of the link packet. Size is a 2-byte unsigned integer. |
| Total Size | Total number of bytes of the user's message that is being transmitted. Total Size is a 2-byte unsigned integer. |

The destination address and destination port comprise the destination socket. Similarly, the source address and the source port comprise the source socket. Since the packet is transmitted between the machines, Destination Address, Destination Port, Source Address, and Source Port are expressed as the real network addresses and port numbers, not the local ID values.

At a client, the DLM receives link packets (i.e., Level 3 data packets) from the MDM and reconstructs the Level 2 data packets (i.e., data messages) for transmission to the MSM. The destination port ID in the DLM header is used by the client DLM to distinguish data from multiple source channels.

The MDM preferably does not interpret or modify the data packets that it receives. In the server, the MDM forwards Level 3 data packets to the network interface. In the client, the MDM forwards Level 4 data packets to the DLM. As such, Level 3 and Level 4 data packets are preferably identical. The MDM is a pass-through layer that provides a common interface for the DLM for all network protocols.

Referring now to FIG. 30, there is shown a representation of a Level 5 data packet comprising a 14-byte network header and up to 1500 bytes of data. In the server, the network interface receives Level 4 data packets (i.e., link packets) of up to 1500 bytes in size. Without interpreting the Level 4 data, the network interface preappends the network header to create a network packet (i.e., Level 5 data packet) compatible with the corresponding communication medium. For example, when the network interface is a Novell ODI-compliant driver, the network interface creates an IEEE 802.3 Ethernet II frame by preappending the 14-byte network header of FIG. 30 to the Level 4 (link) packet. The destination and source addresses are standard 6-byte Ethernet MAC addresses. The 2-byte packet type for multicast system 100 is preferably the hexadecimal value 8442. The Ethernet II frame is handed to the ODI-compliant driver and transported over the physical medium. The DLM link packet header is transmitted on the network along with the network header and the DLM data since the DLM header contains information to be used for reconstructing the message on the receiving channel.

At the client, the network interface receives Level 5 data packets (e.g., Ethernet II frames), strips off the network headers, and transmits the resulting Level 4 data packets (i.e., link packets) to the MDM for transmission to the DLM for eventual reconstruction of the application data streams.

Those skilled in the art will understand that alternative preferred embodiments of the present invention may employ transport media other than, or in addition to, the Ethernet network. In these alternative embodiments, the sizes of the Level 3, 4, and 5 data packets may vary depending upon the requirements of the particular transport media employed. The 24-byte Level 3 DLM header is preferably the same, however, for all preferred embodiments of the present invention.

Media Synchronization

In multicast system 100, data streams may be related in two different ways. First, two or more data streams may be related by being components of the same channel. Second, two or more data streams may be related by being time stamped for synchronization. Data streams are related as channels to provide clients with the ability to receive and process all of the data streams that constitute a program (e.g., the audio and video components of a television program). Data streams are related by time stamping to provide clients with the ability to synchronize the playing of the data streams.

Time stamping is not always necessary. For example, in a channel comprising the audio and video components of a television signal and text of stock market quotes, the text data stream need not be time stamped, since the play of the text data stream by a client does not have to be synchronized with the play of the audio and video data streams.

Two characteristics of multicast system 100 make media synchronization desirable. First, video capture component 1504 and audio capture component 1508 of server 102 of FIG. 15 may capture data at different rates. For example, video data may be captured at a rate of ten video messages/second, while audio data may be captured at a rate of eight audio messages/second. Second, data is transmitted from the server to clients via connectionless data transfer, in which data typically arrives at clients in an asynchronous fashion.

In the server, when a source MSP (1612, 1616, or 1620 of FIG. 16) receives new data, the MSP asks MSM 1608 for a new time-stamp from media sync manager 1624, which the MSP adds to the data header before sending the data to MSM 1608 for transmission to the network and/or storage to mass storage device 1516.

When time stamping is performed, one of the data streams in the channel is designated as the sync target. A client plays data corresponding to the sync target as soon as the data are received from the network. The client attempts to synchronize the playing of all of the other time-stamped data streams with the playing of the sync target.

In the client, media sync manager 1824 of FIG. 18 keeps track of the designated sync target and orchestrates the playing of data for the other time-stamped data streams. Assume, for example, that the audio data stream of a channel having audio and video components is the designated target sync. When audio sink MSP 1818 receives new audio data from the network, MSP 1818 asks sync manager 1824 for playing instructions. Since the audio data stream is the sync target, sync manager 1824 instructs MSP 1818 to play the audio data when MSP 1818 is available to play the data.

Continuing with the same example, when video sink MSP 1814 receives new video data from the network, MSP 1814 asks sync manager 1824 for playing instructions. Sync manager 1824 determines how to instruct MSP 1814 by comparing the time stamp $T_v$ for the new video data with the time stamp $T_a$ of the last audio data. If the magnitude of the difference between $T_v$ and $T_a$ is less than a first threshold (preferably 200 milliseconds), then sync manager 1824 instructs video sink MSP 1814 to play the new video data when MSP 1814 is available to play the data.

If the video data leads the audio data by more than the first threshold, but less than a second threshold (preferably 1500 milliseconds), then sync manager 1824 instructs video sink MSP 1814 to wait before playing the video data. Video sink MSP 1814 preferably places the video data in a queue for later playing.

If the video data lags the audio data by more than the first threshold, but less than the second threshold, then sync manager 1824 instructs video sink MSP 1814 to hurry. Video sink MSP 1814 preferably performs processing to attempt to catch up to the audio sync target (e.g., some form of backoff strategy in which one or more video frames are skipped).

If the video data leads or lags the audio data by more than the second threshold, then sync manager 1824 informs video sink MSP 1814 that an error has occurred. If the video data lags the audio data by more than the second threshold, then video sink MSP 1814 preferably drops the video data If the video data leads the audio data by more than the second threshold, then video sink MSP 1814 preferably saves the video data in a queue to await the corresponding audio data. If the queue becomes full, then video sink MSP 1814 overwrites the oldest video data with the newest video data.

Media synchronization may be used to synchronize multiple independent data streams in any multipoint computer-based network, not just in a multicasting environment. It also applies where data streams are sent on different network channels, to different network addresses, and/or on different networks.

Global Dynamic Loading

Referring now to FIG. 31, there is shown a block diagram of the software architecture of each of server 102 and clients 104 of multicast system 100 of FIG. 1 for loading and unloading of service libraries, according to a preferred embodiment of the present invention. In FIG. 31, service requester 3102 represents any software module of the multicast application program 3104 of server 102 or client 104 that uses sets of functions stored as function libraries in memory 3110. Windows services 3108 is part of the Microsoft Windows application 3106.

Global dynamic loader (GDL) 3116 is part of the executable of multicast application program 3104. GDL 3116 receives all requests to load and unload service libraries from service requester 3102 and posts the requests to global dynamic loader executable (GDLE) 3112, a separate executable running in the system alongside the multicast application program 3104 and the Microsoft Windows application 3106. GDLE 3112 receives and processes the requests for loads and unloads from GDL 3116. In the case of a library load request, GDLE 3112 hands GDL 3116 the entry points for the requested library of loaded services 3114, which GDL 3116 in turn passes back to service requester 3102.

More particularly, service requester 3102 of multicast application 3104 begins the process of loading a library by calling the GDL function GDL_LoadDLL, specifying:

The name of the library to load;

A first pointer to an array of pointers to null terminated strings specifying the entry points to return; and A second pointer to an array of pointers to receive the entry points. The second pointer must point to a block of memory large enough to contain all of the entry points that the caller expects to receive.

The GDL_LoadDLL function determines whether GDLE 3112 is already running. If not, then GDL 3116 starts GDLE 3112 via a call to the Windows entry point WinExec and saves the handle to the GDLE window. If GDLE 3112 is already executing, GDL 3116 retrieves the handle to the GDLE window via a call to the Windows entry point FindWindow.

GDL 3116 encapsulates all of the parameters into the tLoadDLL structure. GDL 3116 passes the address of the tLoadDLL structure to GDLE 3112 via a call to Windows entry point SendMessage with the GDLE window as the destination window and a pointer to the structure as the Param of the message.

Upon receipt of the message from GDL 3116, GDLE 3112 determines if the requested library is new or if it has already been loaded. If it is new, then GDLE 3112 reserves space in its internal load table for the new library, resets a reference count for this library to 0, and calls the Windows entry point LoadLibrary to load the requested library. If the load fails, then GDLE 3112 frees the internal table entry and returns 0 as the handle to the library. If the requested library has already been loaded, then GDLE 3112 increments the reference count for this library in its internal load table and uses the handle to the library stored in its internal load table.

For each function in the list of indicated function names, GDLE 3112 then calls the Windows entry point GetProcAddress and stores the returned address into the papFunct area of the given tLoadDLL structure. After completing the message, GDLE 3112 sends the Windows handle for the loaded library back to GDL 3116 as the return value of the SendMessage call. Control, which was blocked in the SendMessage call, is then returned to GDL 3116, which has the entry points available. Since GDL 3116 passes its papFunct parameter to GDLE 3112 as the location to store the entry points, GDLE 3112 has automatically loaded the caller's memory with the requested entry points. GDL 3116 simply passes the return value from GDLE 3112 as its return value.

To unload a library, service requester 3102 makes a call to the GDL entry point GDL_UnloadDLL, specifying the handle to the previously loaded window. GDL 3116 then performs a Windows PostMessage to GDLE 3112 specifying a request to unload a library and the handle of the library to load.

GDLE 3112 examines its internal load table to determine if the specified library has been loaded. If the library has been loaded and its reference count is greater than 1, GDLE 3112 simply decrements the reference count and returns. If the reference count is 1, then GDLE 3112 calls the Windows function FreeLibrary to unload the given library from memory. GDLE 3112 then frees its internal load table entry for this library and returns an errors code indicating success or failure.

When GDL 3116 uses the Windows PostMessage function to instruct GDLE 3112 to unload a library, the message is placed onto the messages queue for the GDLE main window for processing in the future. Since Windows does not use a preemptive scheduling algorithm, at the call to the PostMessage function, control is not passed immediately to GDLE 3112. The thread from the service requester 3102 to GDL 3116 to unload the library is not preempted but is allowed to complete before the message to GDLE 3112 is processed. Once this thread is complete, Windows gives some execution time to GDLE 3112 and the message is processed, the library is unloaded, and multicast application 3104 is free of the loaded library.

GDL 3116 is also responsible for cleaning up any libraries that have been loaded, if multicast application 3104 should terminate abnormally. When multicast application 3104 terminates, Windows calls the GDL WEP function. GDL 3116 posts a message instructing GDLE 3112 to terminate. GDLE 3112 then prompts the user for the libraries that it should free from its internal load table, frees the indicated libraries, and terminates itself, thereby freeing all memory that it uses. GDL 3116 then completes its termination sequence and is unloaded by Windows.

Those skilled in the art will understand that the global dynamic loading (GDL/GDLE) scheme of multicast system 100 provides certain advantages over traditional solutions to loading libraries. These advantages include reduced memory usage, increased flexibility, and efficient unloading of libraries in the presence of asynchronous callbacks. These advantages are particularly evident when multicasting information whose content is not fixed when the program is loaded as in multicast system 100. For example, one channel may contain audio, video, and text data streams, while another may contain only audio. In addition, different channels may be transmitted over different network transport media at different times.

Traditional methods for loading libraries include (1) the monolithic model (i.e., using one monolithic executable file containing code to process all functionality necessary), (2) the Windows dynamically linked library (DLL) model (i.e., using dynamically linked libraries and letting the underlying operating system swap the libraries in and out of memory as necessary) and (3) using straight calls under program control to the Windows LoadLibrary and FreeLibrary functions. The GDL/GDLE scheme of multicast system 100 provides advantages over each of these traditional solutions.

Because multicast system 100 is driven by interrupts in the DOS/Window environment, it cannot be swapped to disk. Therefore, it is important to keep the memory usage of the program small in order to avoid over-use of scarce resources. In the GDL/GDLE scheme of multicast system 100, the GDLE application determines what services are required. It then loads the services and initializes them. When a service is no longer needed, the GDLE application is able to purge it from memory thereby reclaiming the storage space and reducing overall memory usage. Thus, the GDL/GDLE scheme of multicast system 100 uses memory efficiently.

In addition, multicast system 100 is flexible, because the main application program does not have to be re-written and re-linked when a new media type (i.e., a new type of data stream) is added to the system. In the GDL/GDLE scheme of multicast system 100, the user or the application specifies the module to load. The GDLE is then responsible for loading and executing the specified module. When the service is no longer needed, the application is able to remove the module from memory. With this model of program organization, the application is not changed to experiment with new services. The user simply passes the names of the new services to the application when prompted. In the case where two modules are tested but both cannot be resident in memory at the same time, the application need not be changed. The user enters the name of the first module, tests it, and unloads it. The user is then free to enter the name of the second module, test it, and unload it. There are no conflicts since the two modules are never resident in memory at the same time.

Similarly, the monolithic model of a single executable uses memory less efficiently and is more inflexible than the GDL/GDLE scheme of multicast system 100. Under the monolithic model, all of the functions (i.e., audio, video, and text) are loaded as part of the single executable, even when only a subset of those functions (e.g., audio only) are required for a particular multicast session. As such, the monolithic model uses memory inefficiently.

In addition, the monolithic model is inflexible. The monolithic model would require that the system be re-compiled and/or re-linked, and that a separate executable be built to test each new media type. For example, if several new video algorithms were being tested, several distinct applications would need to be generated and managed.

Similarly, the Windows dynamically linked library (DLL) model uses memory less efficiently and is more inflexible than the GDL/GDLE scheme of multicast system 100. The Windows DLL model cannot necessarily unload a subsystem when channel selection changes. There is no mechanism in Windows to inform it that an automatically loaded library is no longer needed. For example, if a user begins by watching a program containing audio, video, and text, the three modules are brought into memory when they are first referenced. If the user should then switch to a program containing only text, Windows cannot unload the audio and video libraries since Windows cannot be informed that those libraries are no longer being used. As a result, the unused libraries continue to occupy memory.

The Windows dynamically linked library model is also inflexible in that the application program must be informed of any new modules to load. The new modules may be brought into memory automatically by Windows, but the name of the library files must still be embedded in the main executable. This would require re-linking the system for each new combination of libraries. If two new modules could not both be resident in memory at the same time, two new versions of the system would need to be built, since a dynamically loaded library cannot be unloaded automatically. Two code segments would have to be written—one to interface with each of the mutually exclusive libraries.

Although the problems of memory usage and flexibility can be solved by the traditional method of using straight calls to the Windows LoadLibrary and FreeLibrary functions, there remain problems related to the unloading of libraries in the presence of asynchronous callbacks. The application is preferably able to unload a module during an asynchronous callback or execution thread from that module. The monolithic model and the standard Windows dynamically linked library model are impractical, since neither of them allows the user to unload libraries on the fly. For the following reasons, using straight calls to the Windows LoadLibrary and FreeLibrary functions are also inadequate.

Figure 32:
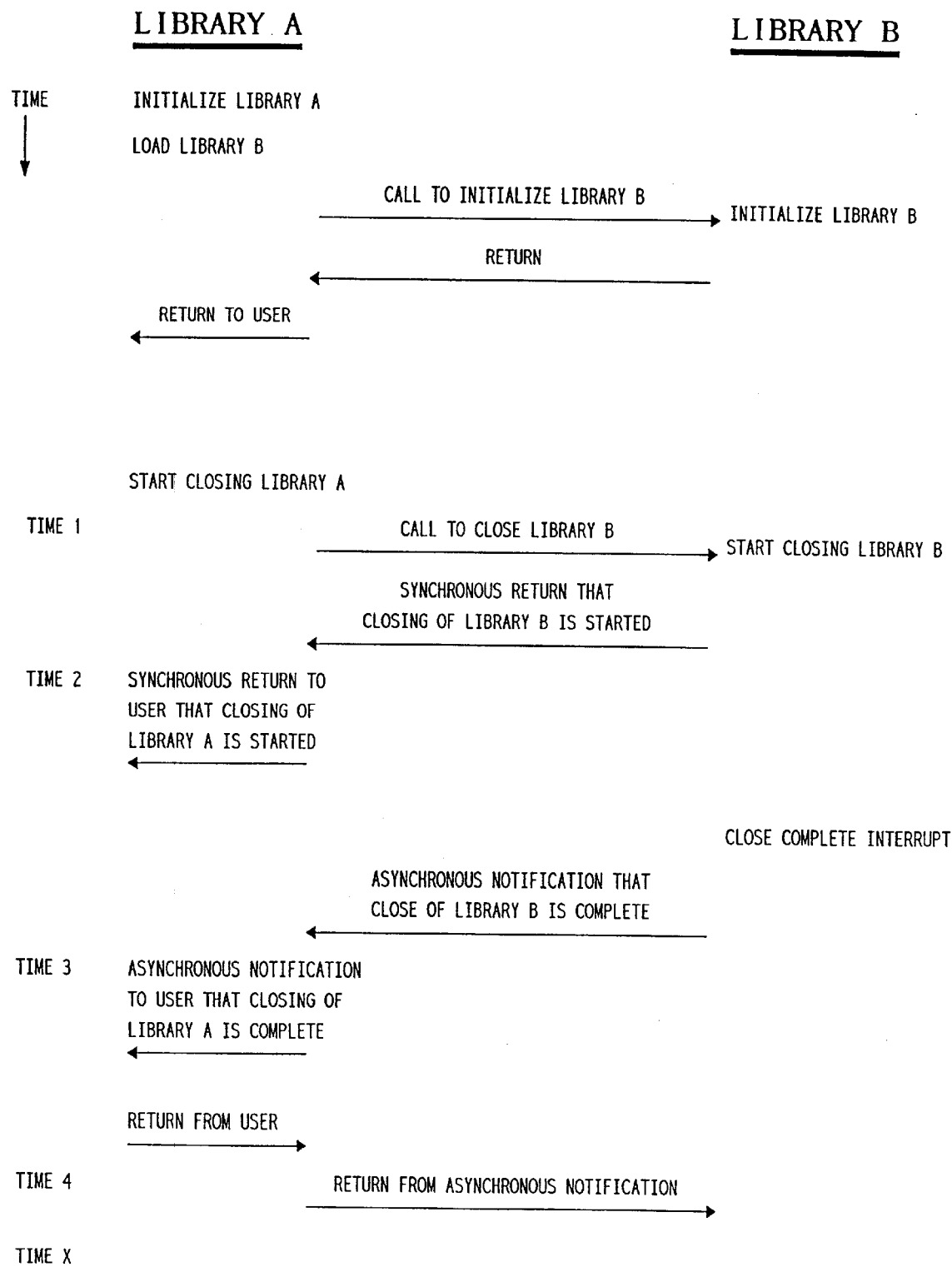
FIG. 32 is a diagram of the timing of function calls when a user opens/closes one module, which in turn opens/closes another module, under the traditional method of using straight calls to the Windows LoadLibrary and FreeLibrary functions.

Referring now to FIG. 32, there is shown a diagram of the timing of function calls when a user opens/closes one module (associated with function library A), which in turn opens/closes another module (associated with function library B), under the traditional method of using straight calls to the Windows LoadLibrary and FreeLibrary functions. In FIG. 32, time increases from top to bottom.

When a user opens library A, library A initializes itself, loads library B, and calls the function that instructs library B to initialize. When library B has completed its initialization, library B returns to library A, which then returns to the user.

When the user calls the function to close library A, library A calls the function that instructs library B to close (at time 1 of FIG. 32). Since the close operation may be time consuming, it is preferably implemented asynchronously. Thus, library B returns synchronously to library A that the close operation is started (at time 2) and then starts the time consuming asynchronous process of closing itself. Library A returns to the user that the synchronous part of the close operation is started.

Some time later, library B receives an interrupt that the close operation is complete. Library B then calls into library A to inform library A that the close operation is complete (time 3). Library A then informs the user that the close operation is complete. The user does everything that it needs to do with the notification and returns to library A (time 4), which then returns to library B when library A is finished with its clean-up.

To complete the process of closing library B, library A also preferably unloads library B. It is assumed that when a library is unloaded it is removed from memory and any subsequent execution in the library is a fatal error. At time 1 of FIG. 32, library A cannot unload library B since library A is about to call into library B to start the close operation. At time 2, library A cannot unload library B since the close operation has only started. Library B must still execute to finish the close operation, and, in fact, library B must be available as the target from an interrupt when the close operation is complete. So library A cannot unload B during the close call.

At times 3 and 4, library A cannot unload library B since library A is on an execution thread that will return to library B when the processing of the asynchronous close notification is complete. Library A would generate a fatal error if library A were to unload library B and then return to library B. Therefore, at no time along this thread of execution has library A been able to unload library B. In fact, the only safe place is at time X in the time line. Unfortunately, library A has, to its user, been closed by this time and library A will not receive any further cycles in which to execute. Thus, under the traditional method of using straight calls to the Windows LoadLibrary and FreeLibrary functions, library A cannot efficiently unload library B.

Under the GDL/GDLE scheme of multicast system 100, library A signals the GDLE with a message that instructs the GDLE to unload library B as soon as the current execution thread completes. This message is preferably sent at time 4 in FIG. 32. Thus, the current invention avoids the problems relating to the unloading of libraries in the presence of asynchronous callbacks. An advantage of the GDL/GDLE scheme of multicast system 100 is that it allows the user to unload libraries at any time, even from execution threads within the same library. GDL signals GDLE to unload the library with the understood semantics of "As soon as you can, after this thread completes, unload this library." The GDL/GDLE implementation under Windows makes use of the fact that Windows will not preempt a thread that is executing. The delay until after the thread is complete is automatic in the call to PostMessage.

Those skilled in the art will understand that the GDL/GDLE scheme of multicast system 100 is applicable to operating systems other than Microsoft Windows. In applying the GDL/GDLE scheme in other operating environments, one must look at what functionality is already provided by the operating system. In an operating system that can preempt an executing thread at any time, other mechanisms are preferably used to ensure that all execution in the library is complete. For example, the unload of a library is usually executed just before a return. Even though the thread returns to the unloaded library, it is not long.

Referring again to FIG. 32, library A would execute an unload at time 4 and immediately return to library B. Library B would then immediately return out of the interrupt context. Execution would occur in library B but it is on the order of about 10 machine instructions. In an operating system that supports messages scheduled to be picked up after a specified time, the GDL could schedule the message to the GDLE at a time far enough in the future where the thread would have to have completed (e.g., 500 milliseconds).

In an alternative preferred embodiment of the present invention, each library determines if there are any threads executing in it. In FIG. 32, library B would determine that there is a thread in it before it calls library A with the close complete notification. Library A would call the GDL to unload library B at time 4 as before and the GDL may immediately send a message to the GDLE. The GDLE would then ask library B if there is an active thread before unloading it.

In this preferred embodiment, every library that is loadable with GDL/GDLE has an entry point named ActiveThread that returns "TRUE" if there is an active thread and "FALSE" if only the current call is active. The GDLE is then responsible for polling the library until it reports that there are no active threads before actually unloading the library. When the GDLE receives a message to unload a library, the GDLE begins another process that repeatedly polls the library to determine if it has an active thread. If the library is active, this process blocks for some time giving the thread a chance to complete. This process continues until the library reports that it is inactive.

In addition, the GDLE preferably unloads a library immediately in the case of abnormal termination of the application. A thread may be active in a library when the application "crashes." Because of the abnormal behavior, the thread may never complete and the GDLE preferably does not wait on it. If so instructed, the GDL may inform the GDLE not to wait on the completing thread.

In general, the GDL/GDLE scheme of the present invention may be implemented in any application that needs to load various services that are not known when the program is built. When the user requests new functionality that is not currently supported by the image in memory, the application loads the library via the GDL. The library and the entry points may be specified by the application or the application may prompt the user for this information.

Under a preferred embodiment, neither the application, the GDL, nor the GDLE make any assumptions about the internals of the libraries. Under an alternative preferred embodiment where the environment requires library support, the application does not change actions based on the functionality of the library. For example, the GDL and GDLE may isolate the application from needing to be aware of the fact that a library may close down asynchronously and cannot be unloaded. The GDL and GDLE provide an interface to the application where the loads and unloads of libraries are essentially atomic. The application is therefore freed from needing to know specific behavior of the library.

Those skilled in the art will understand that alternative embodiments of the multicast system of the present invention may support data types other than or in addition to audio, video, and text, such as graphics, vibration, or smell. In alternative embodiments, some or all of the different data types may be compressed for transmission over the network.

Alternative embodiments of the text reader bar of the present invention may have a single line of horizontally sliding text, one or more lines of vertically scrolling text, or one or more lines of statically displayed text (e.g., as in subtitles).

Alternative embodiments of the multicast system of the present invention may support clients that may receive and process more than one multicast channel at a time. Alternative embodiments may have more than one server. Preferably, each server has all the functionality of a client to provide monitoring capabilities.

Alternative embodiments of the network topology of the present invention may include transport media other than Ethernets and local area networks (LANs), such as combinations of LANs and wide area networks (WANs) connected by T1 lines and routers.

The user interface of the present invention may be used for systems other than those providing multicast services. In general, the user interface may be used in any system that receives and processes multiple data types, including systems that support point-to-point communication (i.e., one copy of data selectively sent to one client), broadcasting (i.e., indiscriminately sending data to every client on the network), and multipoint communication without multicasting (i.e., same data copied multiple times—one copy sent to each selected receiver). Moreover, the data need not be transmitted over a computer network. For example, the data could be played from a local storage device such as a CD-ROM.

Those skilled in the art will understand that multicast system AA may be used to provide real-time or non-real-time transmission of one or more data streams over the network. Real-time transmission implies that the rate of transmission is roughly equivalent to the rate of playing. A client may receive and play real-time transmitted data in real time. Non-real-time transmission implies that the rate of transmission is less than the rate of playing. A client may receive and record non-real-time transmitted data for future playback at a real-time rate.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A client for a network-based multicast system, comprising:
   (a) a media services manager for receiving a first multicast channel from a non-isochronous network, wherein the first multicast channel comprises at least two related data streams;
   (b) at least two media service providers for receiving and playing said related data streams from said media services manager; and
   (c) a client application for informing the media services manager of selection of the first multicast channel, wherein:
   the media services manager loads and opens one of the media service providers for each related data stream of the first multicast channel;
   each media service provider receives and plays one of the related data streams of said first multicast channel;
   the at least two media service providers comprise a first media service provider and a second media service provider;
   the at least two related data streams comprises a first related data stream and a second related data stream;
   the first media service provider plays the first related data stream based on a relationship with the second related data stream played by the second media service provider to coordinate the playing of the first and second data streams;
   the client application informs the media services manager of selection of a second multicast channel to replace the selection of the first multicast channel;
   the media services manager automatically loads and opens one of the media service providers for each related data stream of the second multicast channel not comprised in the first multicast channel; and
   the media services manager automatically closes and unloads one of the media service providers for each related data stream of the first multicast channel not comprised in the second multicast channel.

2. The client of claim 1, further comprising:
   (d) a media sync manager, wherein said media service providers play said related data streams in accordance with instructions from said media sync manager.

3. The client of claim 2, wherein said media sync manager instructs the first media service provider to play said first related data stream now if said first related data stream is a sync target.

4. The client of claim 2, wherein said media sync manager instructs the first media service provider to play the first related data stream in accordance with a comparison of a time stamp of said first related data stream to a time stamp of the second related data stream, wherein the second related data stream is a sync target.

5. The client of claim 1, further comprising:
   (d) a network input driver for receiving said related data streams from the network and for transmitting said related data streams to said media services manager.

6. The client of claim 5, wherein said network input driver comprises:
(1) a data link manager; and
(2) at least one media dependent modules, wherein each of said media dependent modules corresponds to a network medium of said network-based multicast system, wherein:
each of said media dependent modules receives a plurality of link packets from a network interface of a corresponding network medium, each of said link packets comprising a link packet header and a link packet data field;
each of said media dependent modules transmits said plurality of link packets to said data link manager;
said data link manager combines at least one link packet data fields from at least one link packets corresponding to the same data type to generate a data message; and
said data link manager transmits said data message to said media services manager.

7. The client of claim 1, wherein said media services manager is capable of pausing and unpausing the playing of at least one of the related data streams by at least one of said media service providers.

8. A method of processing data by a client in a network-based multicast system, comprising the steps of:
(a) informing a media services manager of the client of selection of a first multicast channel by a client application of the client, wherein the first multicast channel comprises at least two related data streams;
(b) loading and opening one of at least two media service providers of the client for each related data stream of the first multicast channel by the media services manager;
(c) receiving the first multicast channel from a non-isochronous network by the media services manager;
(d) receiving said related data streams from said media services manager by the media service providers;
(e) playing said related data streams by said media service providers, wherein:
each media service provider receives and plays one of the related data streams of said first multicast channel;
the at least two media service providers comprise a first media service provider and a second media service provider;
the at least two related data streams comprises a first related data stream and a second related data stream; and
the first media service provider plays the first related data stream based on a relationship with the second related data stream played by the second media service provider to coordinate the playing of the first and second data streams;
(f) subsequently informing the media services manager of selection of a second multicast channel to replace the selection of the first multicast channel by the client application;
(g) automatically loading and opening one of the media service providers for each related data stream of the second multicast channel not comprised in the first multicast channel by the media services manager; and
(h) automatically closing and unloading one of the media service providers for each related data stream of the first multicast channel not comprised in the second multicast channel by the media services manager.

9. The method of claim 8, wherein step (e) comprises the steps of:
(1) providing instructions by a media sync manager of said client to said media service providers;
(2) playing said related data streams by said media service providers in accordance with said instructions.

10. The method of claim 9, wherein step (e)(1) comprises the step of providing instructions by said media sync manager to the first media service provider to play said first related data stream now if said first related data stream is a sync target.

11. The method of claim 9, wherein step (e)(1) comprises the step of providing instructions by said media sync manager to the first media service provider to play the first related data stream in accordance with a comparison of a time stamp of said first related data stream to a time stamp of the second related data stream, wherein the second related data stream is a sync target.

12. The method of claim 8, wherein step (c) comprises the steps of:
(1) receiving said related data streams by a network input driver from the network; and
(2) transmitting said related data streams by said network input driver to said media services manager.

13. The method of claim 12, wherein step (c)(1) comprises the steps of:
(i) receiving a plurality of link packets by at least one media dependent modules of said network input driver from at least one network media of said network-based multicast system, each of said link packets comprising a link packet header and a link packet data field, wherein each of said media dependent modules corresponds to one of said network media;
(ii) transmitting said plurality of link packets by said media dependent modules to a data link manager of said network input driver;
(iii) combining at least one data link manager data fields from at least one link packets corresponding to the same data type by said data link manager to generate a data message; and
(iv) transmitting said data message by said data link manager to said media services manager.

14. The method of claim 8, further comprising the steps of:
(i) pausing by said media services manager the playing of at least one of the related data streams by at least one of said media service providers; and
(j) unpausing by said media services manager the playing of at least one of the related data streams by at least one of said media service providers.

15. A server for a network-based multicast system, comprising:
(a) at least two media service providers for generating at least two related data streams, wherein:
each media service provider generates one of the related data streams;
the at least two media service providers comprise a first media service provider and a second media service provider;
the at least two related data streams comprises a first related data stream and a second related data stream; and
the first related data stream generated by the first media service provider is to be played based on a relationship with the second related data stream generated by the second media service provider to coordinate the playing of the first and second data streams;

(b) a media services manager for receiving said related data streams from said media service providers and for transmitting said related data streams within a first multicast channel to a non-isochronous network; and (c) a server application for informing the media services manager of selection of the first multicast channel, wherein:

the media services manager loads and opens one of the media service providers for each related data stream of the first multicast channel;

the server application subsequently informs the media services manager of selection of a second multicast channel to replace the selection of the first multicast channel;

the media services manager automatically loads and opens one of the media service providers for each related data stream of the second multicast channel not comprised in the first multicast channel; and the media services manager automatically closes and unloads one of the media service providers for each related data stream of the first multicast channel not comprised in the second multicast channel.

16. The server of claim 15, further comprising:

(d) a media sync manager for providing time stamps for said related data streams.

17. The server of claim 15, further comprising:

(d) a network output driver for receiving said related data streams from said media services manager and for transmitting said related data streams to the network.

18. The server of claim 17, wherein said network output driver comprises:

(1) a data link manager; and (2) at least one media dependent modules, wherein each of said media dependent modules corresponds to a network medium of said network-based multicast system, wherein:

said data link manager receives a plurality of data messages from said media services manager;

said data link manager fragments each of said data messages into at least one link packets, each of said link packets comprising a link packet header and a link packet data field;

said data link manager transmits said link packets to a corresponding media dependent module; and said media dependent module transmits said link packets to a corresponding network interface of said network-based multicast system.

19. A method of processing data by a server in a network-based multicast system, comprising the steps of:

(a) informing a media services manager of the server of selection of a first multicast channel by a server application of the server, wherein the first multicast channel comprises at least two related data streams;

(b) loading and opening one of at least two media service providers of the server for each related data stream of the first multicast channel by the media services manager;

(c) generating the related data streams by the media service providers, wherein:

each media service provider generates one of the related data streams;

the at least two media service providers comprise a first media service provider and a second media service provider;

the at least two related data streams comprises a first related data stream and a second related data stream; and the first related data stream generated by the first media service provider is to be played based on a relationship with the second related data stream generated by the second media service provider to coordinate the playing of the first and second data streams;

(d) receiving said related data streams by the media services manager from said media service providers; and (e) transmitting said related data streams within the first multicast channel by said media services manager to a non-isochronous network;

(f) subsequently informing the media services manager of selection of a second multicast channel to replace the selection of the first multicast channel by the server application;

(g) automatically loading and opening one of the media service providers for each related data stream of the second multicast channel not comprised in the first multicast channel by the media services manager; and (h) automatically closing and unloading one of the media service providers for each related data stream of the first multicast channel not comprised in the second multicast channel by the media services manager.

20. The method of claim 19, wherein step (c) comprises the step of time stamping said related data streams by a media sync manager.

21. The method of claim 19, wherein step (e) comprises the steps of:

(1) receiving said related data streams by a network output driver from said media services manager; and (2) transmitting said related data streams by said network output driver to the network.

22. The method of claim 21, wherein step (e)(2) comprises the steps of:

(i) receiving a plurality of data messages from said media services manager by a data link manager of said network output driver;

(ii) fragmenting each of said data messages into at least one link packets by said data link manager, each of said link packets comprising a link packet header and a link packet data field;

(iii) transmitting said link packets by said data link manager to a media dependent module of said network output driver; said media dependent module corresponding to a network medium of said network-based multicast system; and (iv) transmitting said link packets by said corresponding media dependent module to a corresponding network interface of said network-based multicast system.

* * * * *